United States Patent
Li

(10) Patent No.: US 12,200,679 B2
(45) Date of Patent: Jan. 14, 2025

(54) COMMUNICATION METHOD AND RELATED APPARATUS

(71) Applicant: HUAWEI TECHNOLOGIES CO., LTD., Guangdong (CN)

(72) Inventor: Yanchun Li, Boulogne Billancourt (FR)

(73) Assignee: Huawei Technologies Co., Ltd., Shenzhen (CN)

( * ) Notice: Subject to any disclaimer, the term of this patent is extended or adjusted under 35 U.S.C. 154(b) by 549 days.

(21) Appl. No.: 17/202,927

(22) Filed: Mar. 16, 2021

(65) Prior Publication Data
US 2021/0204267 A1 Jul. 1, 2021

Related U.S. Application Data

(63) Continuation of application No. PCT/CN2019/104961, filed on Sep. 9, 2019.

(30) Foreign Application Priority Data

Sep. 17, 2018 (CN) .......................... 201811082133.2

(51) Int. Cl.
*H04W 72/044* (2023.01)
*H04W 16/28* (2009.01)
(Continued)

(52) U.S. Cl.
CPC ......... *H04W 72/046* (2013.01); *H04W 16/28* (2013.01); *H04W 72/20* (2023.01); *H04W 84/12* (2013.01)

(58) Field of Classification Search
CPC ... H04W 72/046; H04W 72/20; H04W 16/28; H04W 84/12
See application file for complete search history.

(56) References Cited

U.S. PATENT DOCUMENTS

2011/0287776 A1* 11/2011 Vujcic .................. H04W 72/51
455/452.1
2014/0349663 A1* 11/2014 Shu ..................... H04W 74/006
455/450
(Continued)

FOREIGN PATENT DOCUMENTS

| CN | 108023627 A | 5/2018 |
|---|---|---|
| CN | 108270470 A | 7/2018 |

(Continued)

OTHER PUBLICATIONS

Ericsson, "Analysis of beam indication signalling options," 3GPP TSG-RAN WG1 #89ah-NR, R1-1711023, Qingdao, China, Jun. 27-30, 2017, 9 pages.
(Continued)

*Primary Examiner* — Jasper Kwoh
(74) *Attorney, Agent, or Firm* — Fish & Richardson P.C.

(57) ABSTRACT

Example communication methods and apparatus are described. One example method includes sending one or more configuration indications by a first station. One configuration indication in the one or more configuration indications corresponds to one second station in one or more second stations. The configuration indication includes an identifier of the second station and a transmit beam indication, and the transmit beam indication is used to indicate a transmit beam used by the second station to send data. The second station receiving the configuration indication sends the data to the first station through the transmit beam indicated by the transmit beam indication. According to the embodiments of this application, the first station can control the second station to perform data transmission.

20 Claims, 6 Drawing Sheets

(51) Int. Cl.
    *H04W 72/20*  (2023.01)
    *H04W 84/12*  (2009.01)

(56) References Cited

U.S. PATENT DOCUMENTS

| | | | |
|---|---|---|---|
| 2016/0338033 A1 | 11/2016 | Xiao et al. | |
| 2016/0338106 A1* | 11/2016 | Liu | H04W 74/0808 |
| 2017/0303328 A1 | 10/2017 | Cariou et al. | |
| 2018/0069669 A1 | 3/2018 | Park et al. | |
| 2018/0091281 A1 | 3/2018 | Kasher et al. | |
| 2018/0109303 A1 | 4/2018 | Yoo et al. | |
| 2018/0254864 A1* | 9/2018 | Bontu | H04L 5/0035 |
| 2019/0239233 A1* | 8/2019 | Ryu | H04W 72/046 |
| 2019/0335430 A1* | 10/2019 | Ljung | H04B 7/0695 |
| 2021/0143887 A1* | 5/2021 | Oteri | H04B 7/088 |

FOREIGN PATENT DOCUMENTS

| | | |
|---|---|---|
| CN | 108418618 A | 8/2018 |
| WO | 2018017977 A1 | 1/2018 |
| WO | 2018078124 A1 | 5/2018 |

OTHER PUBLICATIONS

IEEE P802.11ax/D2.2, "Draft Standard for Information technology-Telecommunications and information exchange between systems Local and metropolitan area networks-Specific requirements. Part 11: Wireless LAN Medium Access Control(MAC) and Physical Layer (PHY) Specifications, Amendment 6: Enhancements for High Efficiency WLAN," Feb. 2018, 620 pages.

IEEE P802.11ay/D2.0, "Draft Standard for Information Technology-10 Telecommunications and Information Exchange 11 Between Systems-Local and Metropolitan Area 12 Networks-Specific Requirements-Part 11: Wireless 13 LAN Medium Access Control (MAC) and Physical Layer 14 (PHY) Specifications-15, Amendment 7: Enhanced throughput for operation in 16 license-exempt bands above 45 GHz," Jul. 2018, 673 pages.

PCT International Search Report and Written Opinion issued in International Application No. PCT/CN2019/104961 on Nov. 27, 2019, 13 pages (with English translation).

Office Action issued in Chinese Application No. 201811082133.2 on Jul. 29, 2022, 24 pages (with English translation).

Extended European Search Report issued in European Application No. 19861949.6 on Nov. 9, 2021, 12 pages.

* cited by examiner

COMMUNICATION METHOD AND RELATED APPARATUS

CROSS-REFERENCE TO RELATED APPLICATIONS

This application is a continuation of International Application No. PCT/CN2019/104961, filed on Sep. 9, 2019, which claims priority to Chinese Patent Application No. 201811082133.2, filed on Sep. 17, 2018. The disclosures of the aforementioned applications are hereby incorporated by reference in their entireties.

TECHNICAL FIELD

This application relates to the field of communications technologies, and in particular, to a communication method and a related apparatus.

BACKGROUND

With development of a mobile internet and popularization of intelligent terminals, data traffic increases rapidly. A wireless local area network (wireless local area network, WLAN) with advantages of a high rate and low costs has become one of mainstream mobile broadband access technologies.

The wireless local area network may include a plurality of basic service sets. One basic service set may include a plurality of stations. For example, one basic service set includes three stations: one first station and two second stations. In a low-frequency communications system, for example, a communications system supporting the 802.11ax protocol, a first station (for example, an access point) may send a control frame (for example, a trigger frame) to two second stations, and allocate a resource unit (resource unit, RU) to each second station, to control one or more second stations to send data to the first station in parallel by using a corresponding resource unit, thereby improving transmission efficiency.

However, in a current high-frequency communications system, how a first station controls a second station to perform data transmission is a problem that urgently needs to be resolved currently.

SUMMARY

Embodiments of this application provide a communication method and a related device, to control a second station to perform data transmission.

According to a first aspect, an embodiment of this application provides a communication method. The method includes: A first station sends one or more configuration indications. One configuration indication in the one or more configuration indications corresponds to one second station in one or more second stations, the configuration indication includes an identifier of the second station and a transmit beam indication, the transmit beam indication is used to indicate a transmit beam used by the second station to send data, and the identifier of the second station is used to indicate the second station. The first station receives data that is separately sent by the one or more second stations through the transmit beam indicated by the transmit beam indication. It can be learned that based on the method described in the first aspect, the first station can control the one or more second stations to perform data transmission.

Optionally, the first station may specifically control a plurality of second stations to perform data transmission. To be specific, the first station specifically sends configuration indications to the plurality of second stations. In this way, transmit beams of the plurality of second stations are centrally configured by the first station, and the first station can control the plurality of second stations. In a case, the first station may configure, for the plurality of second stations, a plurality of transmit beams having relatively weak mutual interference. This helps avoid beam interference between the plurality of second stations, and the plurality of second stations may send data to the first station in a same time period, thereby improving communication quality and transmission efficiency.

Optionally, the first station may specifically control the plurality of second stations to perform uplink data transmission. To be specific, the first station is an AP, the second station is a STA, and the AP sends configuration indications to the plurality of STAs.

Optionally, when the first station controls the plurality of second stations to perform data transmission, time periods in which the plurality of second stations may send the data may be the same. In this way, data transmission efficiency can be improved. For example, in a scenario in which the first station controls the plurality of second stations to perform uplink data transmission, time periods in which the plurality of STAs send data may be the same.

In an optional implementation, the transmit beam indication includes one or a combination of the following information: a transmit beam identifier, where the transmit beam identifier is used to indicate the transmit beam corresponding to the second station; a transmit antenna identifier, where the transmit antenna identifier is used to indicate a transmit antenna corresponding to the second station; a transmit sector identifier, where the transmit sector identifier is used to indicate a transmit sector corresponding to the second station; and a second antenna weight vector AWV identifier, where the second AWV identifier is used to indicate an AWV corresponding to the second station. Based on this implementation, the first station can explicitly or implicitly indicate the transmit beam corresponding to the second station.

In an optional implementation, the transmit beam indication includes one or a combination of the following information: an antenna configuration number, where the antenna configuration number is used to indicate an antenna configuration of a station group to which the second station belongs; and a spatial stream bitmap, where the spatial stream bitmap is used to indicate a spatial stream corresponding to the second station, and the antenna configuration includes a correspondence between a transmit antenna and a transmit beam in the station group. Based on this implementation, the first station can implicitly indicate the transmit beam corresponding to the second station.

Optionally, in addition to the transmit beam indication, the configuration indication may further include a receive beam indication of the first station. The receive beam indication of the first station includes one or a combination of the following information: a receive antenna identifier, where the receive antenna identifier is used to indicate a receive antenna of the first station; a receive sector identifier, where the receive sector identifier is used to indicate a receive sector of the first station; and a first AWV identifier, where the first AWV identifier is used to indicate an AWN of the first station. In this way, the second station may be notified of a receiving configuration used when the first station receives the data of the second station, so that the second station performs a corresponding operation based on the receiving configuration of the first station.

In an optional implementation, the transmit beam indication includes one or a combination of the following information: the receive antenna identifier, where the receive antenna identifier is used to indicate the receive antenna of the first station; the receive sector identifier, where the receive sector identifier is used to indicate the receive sector of the first station; and the first antenna weight vector AWV identifier, where the first AWV identifier is used to indicate the AWV of the first station. Based on this implementation, the first station can implicitly indicate the transmit beam corresponding to the second station.

In an optional implementation, before the first station sends the one or more configuration indications, the first station sends a correspondence to the one or more second stations. The correspondence is a correspondence between the antenna configuration number and the antenna configuration of the station group. Based on this implementation, the second station can learn of the correspondence between the antenna configuration number and the antenna configuration of the station group, so that after receiving the antenna configuration number, the second station can determine an antenna configuration of the second station, and further determine the transmit beam corresponding to the second station.

In an optional implementation, the configuration indication is carried in at least one physical layer protocol data unit PPDU, and the configuration indication is carried in one or more of the following information in the PPDU: a physical layer header, a media access layer header, media access layer frame content, and a control trailer. Optionally, the configuration indication is specifically carried in at least one PPDU in an A-PPDU. Because a plurality of physical layer headers may be repeatedly sent, the configuration indication is carried in the physical layer header, thereby helping improve reliability of the configuration indication, and the configuration indication is carried in the physical layer header, thereby helping the second station obtain the configuration indication in advance, so that preparation time for sending data is more sufficient. The configuration indication is carried in the MAC header. Because a plurality of MAC headers may be repeatedly sent, the configuration indication is carried in the MAC header, thereby helping improve reliability of the configuration indication. The configuration indication is carried in the MAC frame content, so that a transmission bit can be flexibly allocated to the configuration indication, thereby helping reduce bit overheads. The configuration indication is carried in the control trailer, so that a data sending time of the second station can be conveniently determined.

In an optional implementation, the configuration indication is carried in a trigger frame, and the trigger frame is used to trigger the second station to send the data to the first station through the transmit beam indicated by the transmit beam indication. Based on this implementation, the first station may indicate the transmit beam of the second station by using the trigger frame, and can trigger, by using the trigger frame, the second station to send the data through the corresponding transmit beam.

In an optional implementation, the configuration indication of the trigger frame further carries a receiving configuration indication. The receiving configuration indication is used to indicate a receive beam that needs to be used by the second station to receive a target frame. For example, the target frame may be an ACK frame, a response frame, a trigger frame other than the current trigger frame, or the like.

Based on this implementation, a receiving space configuration of the trigger frame other than the current trigger frame, the ACK frame, or the response frame may be indicated to the second station in advance by using the trigger frame, so that the second station can prepare in advance to receive the trigger frame other than the current trigger frame, the ACK frame, or the response frame.

In an optional implementation, the configuration indication is carried in a preparation frame sent before a trigger frame. To be specific, after sending, to the one or more second stations, the preparation frame that carries the configuration indication, the first station sends the trigger frame to the one or more second stations. Based on this implementation, the first station may indicate the transmit beam of the second station in advance by using the preparation frame, so that the second station can have sufficient time to configure the transmit beam.

Optionally, the preparation frame further carries a receiving configuration indication of a target frame. The receiving configuration indication is used to indicate a receive beam that needs to be used by the second station to receive the target frame. For example, the target frame may be an ACK frame, a response frame, a trigger frame other than the current trigger frame, or the like. Based on this implementation, a receiving space configuration of the trigger frame, the ACK frame, or the response frame may be indicated to the second station in advance by using the preparation frame, so that the second station can prepare in advance to receive the trigger frame, the ACK frame, or the response frame.

In an optional implementation, the first station sends a time indication to the one or more second stations, where the time indication is used to indicate a data sending time of the second station, or is used to indicate a data sending time of the transmit beam that needs to be used by the second station to send the data. Based on this implementation, the first station can control and indicate the data sending time of the second station.

Optionally, the time indication includes one or more of the following information: a first offset, a second offset, a third offset, a fourth offset, a downlink reference signal sequence used by the second station and a fifth offset, spatial stream allocation information of the second station, a sixth offset, and indication information used to indicate STF information. The first offset is a time offset relative to a first preset interval. The second offset is a time offset relative to a second preset interval. The third offset is a time offset relative to a third preset interval. The fourth offset is a time offset relative to a fourth preset interval. The fifth offset is a time offset relative to a fifth preset interval. The sixth offset is a time offset relative to a sixth preset interval. Optionally, the first preset interval, the second preset interval, the third preset interval, the fourth preset interval, the fifth preset interval, or the sixth preset interval may be a SIFS, an LBIFS, or a BRPIFS.

In an optional implementation, the first station sends transmission control information to the one or more second stations, where the transmission control information includes one or more of the following information, first indication information, second indication information, third indication information, fourth indication information, fifth indication information, sixth indication information, seventh indication information, eighth indication information, ninth indication information, tenth indication information, and eleventh indication information. The first indication information is used to indicate a data transmission rate of the second station. The second indication information is used to indicate a spatial multiplexing SM manner of the second station. The third indication information is used to indicate whether the second station uses a space-time block coding STBC scheme. The fourth indication information is used to indicate whether the second station uses a dual-carrier modulation DCM scheme. The fifth indication information is used to indicate spatial stream mapping. The sixth indication information is used to indicate transmission content of the second station. The seventh indication information is used to indicate a transmission bandwidth of the second station. The eighth indication information is used to indicate a physical layer protocol data unit PPDU format of the second station. The ninth indication information is used to indicate transmit opportunity duration of the second station. The tenth indication information is used to indicate training TRN information of the second station. The eleventh indication information is used to indicate a transmit power of the second station. Another parameter of the second station can be controlled by sending the transmission control information to the one or more second stations.

In an optional implementation, the first station may further send, to the one or more second stations, indication information used to indicate a manner of sending an acknowledgement frame. For example, the acknowledgement frame may be sent in a TDM manner or an SDM manner. In this implementation, the second station needs to enter a receiving mode after data sending is completed, and the second station needs to perform receiving preparation based on the manner of sending the acknowledgement frame by the first station, to receive the acknowledgement frame sent by the first station. Therefore, based on this implementation, the second station can successfully receive the acknowledgement frame.

According to a second aspect, an embodiment of this application provides a communication method. The method includes: A second station receives a configuration indication sent by a first station. The configuration indication includes an identifier of the second station and a transmit beam indication, the transmit beam indication is used to indicate a transmit beam used by the second station to send data, and the identifier of the second station is used to indicate the second station. The second station sends the data to the first station through the transmit beam indicated by the transmit beam indication. It can be learned that based on the method described in the second aspect, the first station can control the second station to perform data transmission.

In an optional implementation, the first station is an access point AP, and the second station is a station STA. Based on this implementation, the first station can control the second station to perform uplink data transmission.

In an optional implementation, the transmit beam indication includes one or a combination of the following information: a transmit beam identifier, where the transmit beam identifier is used to indicate the transmit beam corresponding to the second station; a transmit antenna identifier, where the transmit antenna identifier is used to indicate a transmit antenna corresponding to the second station; a transmit sector identifier, where the transmit sector identifier is used to indicate a transmit sector corresponding to the second station; and a second antenna weight vector AWV identifier, where the second AWV identifier is used to indicate an AWV corresponding to the second station. Based on this implementation, the first station can explicitly or implicitly indicate the transmit beam corresponding to the second station.

In an optional implementation, the transmit beam indication includes one or a combination of the following information: an antenna configuration number, where the antenna configuration number is used to indicate an antenna configuration of a station group to which the second station belongs, and the antenna configuration includes a correspondence between a transmit antenna and a transmit beam in the station group; and a spatial stream bitmap, where the spatial stream bitmap is used to indicate a spatial stream corresponding to the second station. Based on this implementation, the first station can implicitly indicate the transmit beam corresponding to the second station.

In an optional implementation, before the second station receives the configuration indication sent by the first station, the second station receives a correspondence sent by the first station. The correspondence is a correspondence between an antenna configuration number and a transmit antenna configuration of the station group. Based on this implementation, the second station can learn of the correspondence between the antenna configuration number and the antenna configuration of the station group, so that after receiving the antenna configuration number, the second station can determine an antenna configuration of the second station, and further determine the transmit beam corresponding to the second station.

Optionally, in addition to the transmit beam indication, the configuration indication may further include a receive beam indication of the first station. The receive beam indication of the first station includes one or a combination of the following information: a receive antenna identifier, where the receive antenna identifier is used to indicate a receive antenna of the first station; a receive sector identifier, where the receive sector identifier is used to indicate a receive sector of the first station; and a first AWV identifier, where the first AWV identifier is used to indicate an AWV of the first station. In this way, the second station may be notified of a receiving configuration used when the first station receives the data of the second station, so that the second station performs a corresponding operation based on the receiving configuration of the first station.

In an optional implementation, the transmit beam indication includes one or a combination of the following information: the receive antenna identifier, where the receive antenna identifier is used to indicate the receive antenna of the first station; the receive sector identifier, where the receive sector identifier is used to indicate the receive sector of the first station; and the first antenna weight vector AWV identifier, where the first AWV identifier is used to indicate the AWV of the first station. Based on this implementation, the first station can implicitly indicate the transmit beam corresponding to the second station.

In an optional implementation, the configuration indication is carried in at least one physical layer protocol data unit PPDU, and the configuration indication is carried in one or more of the following information in the PPDU: a physical layer header, a media access layer header, media access layer frame content, and a control trailer. Optionally, the configuration indication is specifically carried in at least one PPDU in an A-PPDU. Because a plurality of physical layer headers may be repeatedly sent, the configuration indication is carried in the physical layer header, thereby helping improve reliability of the configuration indication, and the configuration indication is carried in the physical layer header, thereby helping the second station obtain the configuration indication in advance, so that preparation time for sending data is more sufficient. The configuration indication is carried in the MAC header. Because a plurality of MAC headers may be repeatedly sent, the configuration indication is carried in the MAC header, thereby helping improve reliability of the configuration indication. The configuration indication is carried in the MAC frame content, so that a transmission bit can be flexibly allocated to the configuration indication, thereby helping reduce bit overheads. The configuration indication is carried in the control trailer, so that a data sending time of the second station can be conveniently determined.

In an optional implementation, the configuration indication is carried in a trigger frame, and the trigger frame is used to trigger the second station to send the data to the first station through the transmit beam indicated by the transmit beam indication. Specifically, after receiving the trigger frame, the second station sends the data through the transmit beam. Based on this implementation, the transmit beam of the second station can be indicated by the trigger frame, and the second station can be triggered to send the data through the determined transmit beam.

Optionally, the trigger frame further carries a receiving configuration indication. The receiving configuration indication is used to indicate a receive beam that needs to be used by the second station to receive a target frame. After receiving the receiving configuration indication, the second station determines the receive beam based on the receiving configuration indication, and receives the target frame through the receive beam. For example, the target frame may be an ACK frame, a response frame, a trigger frame other than the current trigger frame, or the like. Based on this implementation, a receiving space configuration of the trigger frame other than the current trigger frame, the ACK frame, or the response frame may be indicated to the second station in advance by using the trigger frame, so that the second station can prepare in advance to receive the trigger frame other than the current trigger frame, the ACK frame, or the response frame.

In an optional implementation, the configuration indication is carried in a preparation frame sent before a trigger frame. To be specific, after receiving, from the first station, the preparation frame that carries the configuration indication, the second station receives the trigger frame from the first station. Based on this implementation, the first station may indicate the transmit beam of the second station in advance by using the preparation frame, so that the second station can have sufficient time to configure the transmit beam.

Optionally, the preparation frame further carries a receiving configuration indication. The receiving configuration indication is used to indicate a receive beam that needs to be used by the second station to receive a target frame. After receiving the receiving configuration indication, the second station determines the receive beam based on the receiving configuration indication, and receives the target frame through the receive beam. For example, the target frame may be an ACK frame, a response frame, a trigger frame other than the current trigger frame, or the like. Based on this implementation, a receiving space configuration of the trigger frame, the ACK frame, or the response frame may be indicated to the second station in advance by using the preparation frame, so that the second station can prepare in advance to receive the trigger frame, the ACK frame, or the response frame.

In an optional implementation, the second station receives a time indication from the first station, where the time indication is used to indicate a sending time at which the second station sends the data, or is used to indicate a data sending time of the transmit beam that needs to be used by the second station to send the data. Specifically, the second station sends the data at the data sending time through the transmit beam corresponding to the second station. Based on this implementation, the first station can control and indicate the data sending time of the second station.

Optionally, the time indication includes one or more of the following information: a first offset, a second offset, a third offset, a fourth offset, a downlink reference signal sequence used by the second station and a fifth offset, spatial stream allocation information of the second station, a sixth offset, and indication information used to indicate STF information. The first offset is a time offset relative to a first preset interval. The second offset is a time offset relative to a second preset interval. The third offset is a time offset relative to a third preset interval. The fourth offset is a time offset relative to a fourth preset interval. The fifth offset is a time offset relative to a fifth preset interval. The sixth offset is a time offset relative to a sixth preset interval.

For example, the second station may determine a data sending time $T4$ of the transmit beam corresponding to the second station based on an end time $T1$ of a frame in which the time indication is located, a first preset interval $T2$, and the first offset $T3$ after receiving the first offset. $T4=T1+T2+T3$. Optionally, the end time of the frame in which the time indication is located may be an energy end time of the frame in which the time indication is located.

For another example, the second station may determine a data sending time $T4$ of the transmit beam corresponding to the second station based on a time $T1$ at which the second station sends data last time, a second preset interval $T2$, and the second offset $T3$ after receiving the second offset. $T4=T1+T2+T3$.

For another example, the second station may determine a data sending time $T4$ of the transmit beam corresponding to the second station based on an end time $T1$ of a received TRN reference signal, a third preset interval $T2$, and the third offset $T3$ after receiving the third offset. $T4=T1+T2+T3$.

For another example, the second station may determine a data sending time $T4$ of the transmit beam corresponding to the second station based on an end time $T1$ of an acknowledgement frame, a fourth preset interval $T2$, and the fourth offset $T3$ after receiving the fourth offset. $T4=T1+T2+T3$. The acknowledgement frame is a frame that is sent by the first station to a second station after the first station receives data sent by the second station and that is used to acknowledge receiving of the data sent by the second station.

For another example, the downlink reference signal sequence is a CEF sequence. After receiving the CEF sequence used by the second station, the second station may determine a data sending time $T4$ of a transmit beam corresponding to the second station 1 based on an end time $T1$ of the CEF sequence, a fifth preset interval $T2$, and a fifth offset $T3$. $T4=T1+T2+T3$. The second station sends the data to the first station at the data sending time $T4$ through the transmit beam corresponding to the second station.

For another example, the second station may determine, based on a spatial stream allocation sequence and a quantity of allocated spatial streams, the downlink reference signal sequence (for example, a CEF or an LTF) used by the second station. Further, the second station may determine a data sending time $T4$ of the transmit beam corresponding to the second station based on an end time $T1$ of the downlink reference signal sequence, a sixth preset interval $T2$, and a sixth offset $T3$. $T4=T1+T2+T3$.

Optionally, the first preset interval, the second preset interval, the third preset interval, the fourth preset interval, the fifth preset interval, or the sixth preset interval may be a SIFS, an LBIFS, or a BRPIFS.

In an optional implementation, the first station sends transmission control information to the one or more second stations, where the transmission control information includes one or more of the following information: first indication information, second indication information, third indication information, fourth indication information, fifth indication information, sixth indication information, seventh indication information, eighth indication information, ninth indication information, tenth indication information, and eleventh indication information. The first indication information is used to indicate a data transmission rate of the second station. The second indication information is used to indicate a spatial multiplexing SM manner of the second station. The third indication information is used to indicate whether the second station uses a space-time block coding STBC scheme. The fourth indication information is used to indicate whether the second station uses a dual-carrier modulation DCM scheme. The fifth indication information is used to indicate spatial stream mapping. The sixth indication information is used to indicate transmission content of the second station. The seventh indication information is used to indicate a transmission bandwidth of the second station. The eighth indication information is used to indicate a physical layer protocol data unit PPDU format of the second station. The ninth indication information is used to indicate transmit opportunity duration of the second station. The tenth indication information is used to indicate training TRN information of the second station. The eleventh indication information is used to indicate a transmit power of the second station. Another parameter of the second station can be controlled by sending the transmission control information to the one or more second stations.

In an optional implementation, indication information used to indicate a manner of sending an acknowledgement frame is received from the first station, and the manner of sending the acknowledgement frame is determined based on the indication information. For example, the acknowledgement frame may be sent in a TDM manner or an SDM manner. In this implementation, the second station needs to enter a receiving mode after data sending is completed, and the second station needs to perform receiving preparation based on the manner of sending the acknowledgement frame by the first station, to receive the acknowledgement frame sent by the first station. Therefore, implementing this implementation helps the second station successfully receive the acknowledgement frame.

According to a third aspect, a wireless communications apparatus is provided. The apparatus may perform the method in the first aspect, the second aspect, the possible implementations of the first aspect, or the possible implementations of the second aspect. The function may be implemented by hardware, or may be implemented by hardware by executing corresponding software. The hardware or the software includes one or more units corresponding to the foregoing function. The unit may be software and/or hardware. Based on a same inventive concept, for a problem-resolving principle and beneficial effects of the apparatus, refer to the first aspect, the second aspect, the possible implementations of the first aspect, or the possible implementations of the second aspect and beneficial effects. Details are not described herein again.

According to a fourth aspect, a wireless communications apparatus is provided. The apparatus includes a processor, a baseband circuit, a radio frequency circuit, and an antenna. Optionally, the apparatus may further include a memory. Optionally, the processor, the baseband circuit, the radio frequency circuit, the antenna, and the memory are connected by using a bus. One or more programs are stored in the memory, and the processor invokes the program stored in the memory, to implement the solution in the first aspect, the second aspect, the possible implementations of the first aspect, or the possible implementations of the second aspect. For a problem-resolving implementation of the apparatus and beneficial effects, refer to the first aspect, the second aspect, the possible implementations of the first aspect, or the possible implementations of the second aspect and beneficial effects. Details are not described herein again.

According to a fifth aspect, a computer program product is provided. When the computer program product runs on a computer, the computer is enabled to perform the method in the first aspect, the second aspect, the possible implementations of the first aspect, or the possible implementations of the second aspect.

According to a sixth aspect, an apparatus is provided. The apparatus may be a chip product, and includes a processor. The processor is configured to be coupled to a memory. When the processor executes an instruction stored in the memory, the apparatus is enabled to perform the method in the first aspect, the second aspect, the possible implementations of the first aspect, or the possible implementations of the second aspect.

According to a seventh aspect, a computer-readable storage medium is provided. The computer-readable storage medium stores an instruction, and when the instruction is run on a computer, the computer is enabled to perform the method in the first aspect, the second aspect, the possible implementations of the first aspect, or the possible implementations of the second aspect.

DESCRIPTION OF EMBODIMENTS

Figure 1:
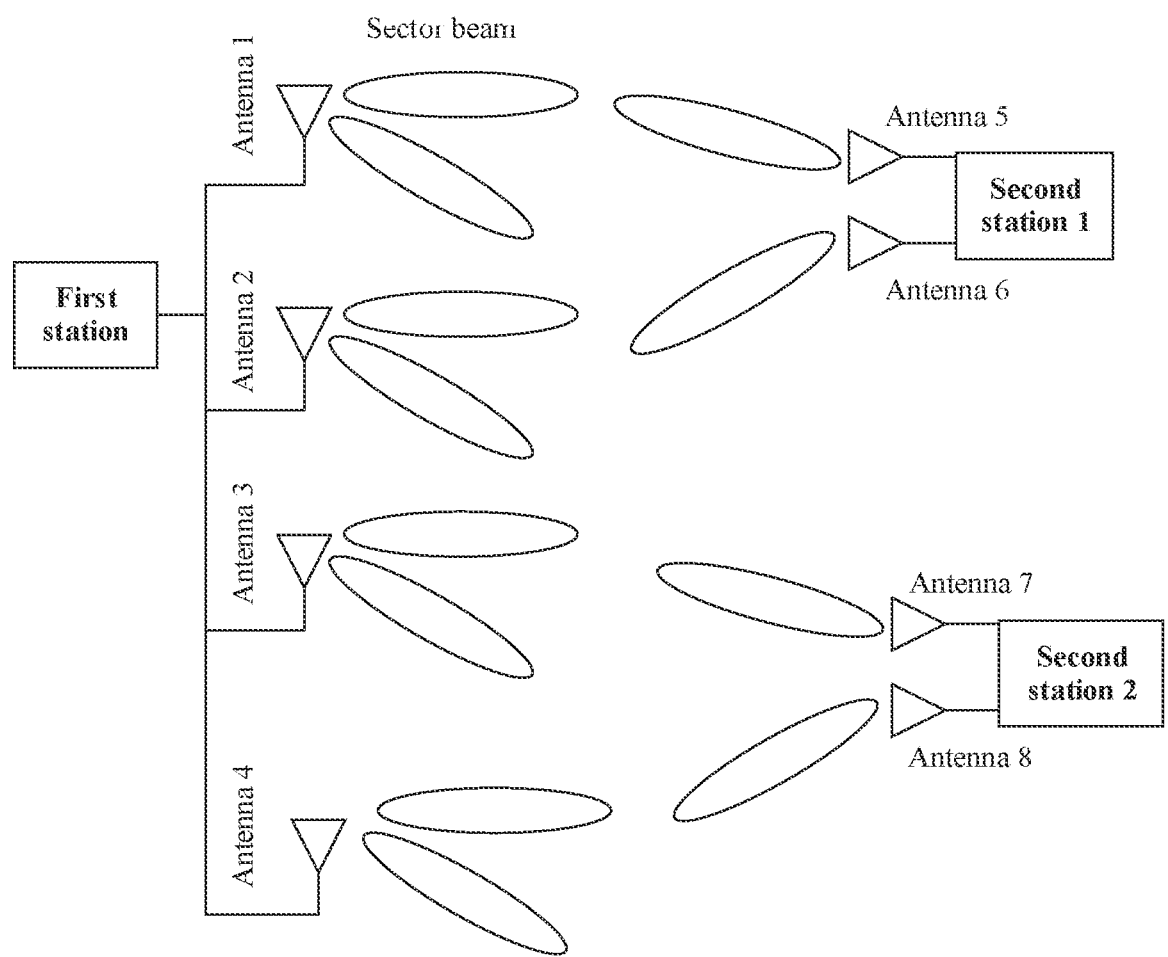
FIG. 1 is a schematic structural diagram of a system architecture according to an embodiment of this application.

The following further describes specific embodiments of this application in detail with reference to accompanying drawings.

In a low-frequency communications system, for example, a communications system supporting the 802.11ax protocol, a first station (for example, an access point) may send a control frame (for example, a trigger frame) to two second stations, and allocate an RU to each second station, to control one or more second stations to send data to the first station in parallel by using a corresponding resource unit, thereby improving transmission efficiency. However, in a current high-frequency communications system, how a first station controls one or more second stations to perform data transmission is a problem that urgently needs to be resolved currently. Therefore, the embodiments of this application provide a communication method and a related device, to control the one or more second stations to perform data transmission.

To better understand the embodiments of this application, the following describes some terms in the embodiments of this application.

An antenna is usually a single basic antenna including a phase array, or is an assembly including a series of switchable beam antennas. The antenna may form a pseudo-omnidirectional pattern as a whole. Regardless of an implementation, the antenna may be dynamically configured as a pseudo-omnidirectional pattern to perform sending or receiving, or may be dynamically configured to perform sending or receiving for a specific sector or beam direction.

Antenna weight vector: antenna weight vector, AWV.
Media access control; media access control, MAC.
Physical layer; physical layer. PHY.
Physical layer convergence protocol, physical layer convergence protocol. PLCP, which belongs to a sublayer of the PHY.
MAC service data unit: MAC service data unit, MSDU.
MAC protocol data unit: MAC protocol data unit, MPDU.
PLCP service data unit: PLCP service data unit, PSDU.
Physical layer protocol data unit: presentation protocol data unit, PPDU.
Aggregate physical layer protocol data unit: aggregate presentation protocol data unit, A-PPDU.
Cyclic redundancy check: cyclic redundancy check, CRC.
Training: training, TRN.
Spatial multiplexing: spatial multiplexing, SM.
Space time block code: space time block code, STBC.
Dual carrier modulation: dual carrier modulation, DCM.
Acknowledgement: acknowledgement, ACK.
Short training field: short training field, STF.
Short inter-frame spacing (SIFS): short inter-frame spacing.
Long beamforming interframe space: long beamforming interframe space, LBIFS.
Short beamforming interframe space: short beamforming interframe space, SBIFS. The SBIFS is used to space a plurality of times of transmission from one transmitter, or is used when different antenna configurations are used for transmission and there is no need to expect a response received after a SIFS time interval. Duration of the SBIFS is determined based on a physical layer feature, and a typical value is 0.03 µs.
Time division multiplexing: time division multiplexing, TDM.
Spatial division multiplexing: spatial division multiplexing, SDM.
Channel estimation field: channel estimation field, CEF.
Long training field: long training field, LTF.

To better understand the embodiments of this application, the following describes a system architecture to which the embodiments of this application are applicable and a main idea.

FIG. 1 is a schematic diagram of a system architecture according to an embodiment of this application. As shown in FIG. 1, the system architecture includes a first station and two second stations. Certainly, the system architecture may alternatively include one second station or more than two second stations. In FIG. 1, an example in which the system architecture includes the two second stations is used for description.

The first station has one or more antennas, and the second station also has one or more antennas. As shown in FIG. 1, FIG. 1 uses an example in which the first station includes four antennas, and a second station 1 and a second station 2 each include two antennas. As shown in FIG. 1, the first station includes an antenna 1 to an antenna 4, the second station 1 includes an antenna 5 and an antenna 6, and the second station 2 includes an antenna 7 and an antenna 8. Data may be transmitted between the first station and the second station by using an antenna transmit beam. Optionally, for a station, a same antenna may be used to receive and transmit a signal. The antenna is a transmit antenna when a signal is transmitted, and is a receive antenna when a signal is received.

In this embodiment of this application, the first station may send, to one or more second stations, a configuration indication used to indicate a transmit beam that is used by the second station to send data. After receiving the configuration indication, the second station may send the data to the first station through the transmit beam indicated by the configuration indication. It can be learned that based on the communication method, the first station can control and configure the one or more second stations to perform data transmission. In an application scenario, the first station may be an access point (access point, AP), and the second station may be a station (station, STA). The AP sends a configuration indication to a plurality of STAs, to indicate each STA to send uplink data by using a corresponding transmit beam, thereby implementing uplink multi-user data transmission.

Certainly, alternatively, the first station may be a STA, and the second station may be an AP. Alternatively, both the first station and the second station are STAs. Alternatively, both the first station and the second station are APs. This is not limited in this embodiment of this application.

The access point in this embodiment of this application may be any device that has a wireless transceiver function or a chip that is disposed in the device. The device includes but is not limited to an evolved NodeB (evolved NodeB, eNB), a radio network controller (radio network controller, RNC), a NodeB (NodeB, NB), a base station controller (base station controller, BSC), a base transceiver station (base transceiver station, BTS), a home base station (for example, a home evolved NodeB, or a home NodeB, HNB), a base band unit (base band Unit, BBU), and an access point (access point, AP), a wireless relay node, a wireless backhaul node, a transmission point (transmission point, TP), a transmission reception point (transmission and reception point, TRP), or the like in a wireless fidelity (wireless fidelity, Wi-Fi) system. The device may alternatively be a base station supporting a 5G protocol, or the like. The STA is a communications apparatus having a wireless communication function. The STA may also be referred to as a user, and may be a wireless sensor, a wireless communications terminal, or a mobile terminal, for example, a mobile phone (which is also referred to as a "cellular" phone) supporting a wireless fidelity (wireless fidelity, Wi-Fi) communication function and a computer having a wireless communication function. For example, the STA may be a portable, pocket-sized, handheld, computer built-in, wearable, or vehicle-mounted wireless communications apparatus that supports a Wi-Fi communication function, and exchanges communications data such as voice or data with a radio access network.

The following describes other related content in the embodiments of this application.

A beam refers to a direction in which a signal is sent or received through an antenna, and is usually implemented by using an array including a plurality of antenna elements on the antenna. The antenna may be used to form a specific spatial direction of a transmitted signal or a received signal, to align a signal and/or avoid interference. In the embodiments of this application, the beam may alternatively refer to a sector, and a beam identifier may alternatively refer to a sector identifier.

Beamforming (beamforming, BF) is a method in which two or more communication parties implement a necessary transmission link budget for a subsequent communication process. To be specific, a transmitted signal and/or a received signal are/is concentrated in a beam direction pointing to a receiver or a transmitter, to enhance a signal, so that communication signal quality is improved. In millimeter wave communication, to implement data receiving and sending, a transmit beam direction of a data initiator needs to cover a receive beam direction of a data receiver, in other words, a transmit beam and a receive beam can be aligned. A process of beam alignment between a receiving party and a sending party is referred to as a beamforming training process.

Optionally, the beamforming training process is mainly comprises two phases. The first phase is sector level sweep (sector level sweep, SLS). In this phase, a responder and an initiator determine optimal transmit beam by exchanging sector sweep frames. The second phase is a beam refinement protocol (beam refinement protocol, BRP). In this phase, the responder and the initiator determine optimal transmit and receive beams of the responder and the initiator by using a BRP frame. Certainly, beamforming training may alternatively be performed in another manner. A manner of performing beamforming training is not limited in the embodiments of this application. In other words, after a first station and a second station perform beamforming training, the first station and the second station may obtain optimal transmit beams and optimal receive beams of the both.

After beamforming training, the first station may have one or more of the following information: a transmit beam identifier of the second station, a correspondence between a transmit antenna identifier and the transmit beam identifier of the second station, a correspondence between a transmit sector identifier and the transmit beam identifier of the second station, a correspondence between a second AWV identifier and a second AWV of the second station, a correspondence between a receive antenna identifier of the first station and the transmit beam identifier of the second station, a correspondence between a receive sector identifier of the first station and the transmit beam identifier of the second station, and a correspondence between a first AWV identifier of the first station and a first AWV. The foregoing information that the first station has may be obtained after beamforming training, or may be obtained in another manner. This is not limited in the embodiments of this application.

The second station may also have one or more of the following information: the correspondence between the transmit antenna identifier and the transmit beam identifier of the second station, the correspondence between the transmit sector identifier and the transmit beam identifier of the second station, the correspondence between the second AWV identifier and the second AWV of the second station, the correspondence between the receive antenna identifier of the first station and the transmit beam identifier of the second station, the correspondence between the receive sector identifier of the first station and the transmit beam identifier of the second station, and the correspondence between the first AWV identifier of the first station and the transmit beam identifier of the second station. The foregoing information that the second station has may be obtained after beamforming training, or may be obtained in another manner. This is not limited in the embodiments of this application.

The following describes the correspondence between the transmit antenna identifier and the transmit beam identifier of the second station.

In the embodiments of this application, in the correspondence between the transmit antenna identifier and the transmit beam identifier of the second station, a transmit beam corresponding to a transmit antenna may be an optimal transmit beam that is of the transmit antenna and that is obtained after beamforming training. Alternatively, a transmit beam corresponding to a transmit antenna may not be an optimal transmit beam of the transmit antenna. This is not limited in the embodiments of this application. An optimal transmit beam of the second station throughout the embodiments of this application may be understood as a transmit beam that maximizes a received signal strength of the first station, a transmit beam that maximizes a ratio of a received signal strength of the first station to an interference or noise intensity, and/or a transmit beam that maximizes a received signal strength of the first station when an interference or noise intensity is less than a preset threshold.

For example, the first station and the second station 1 may include a correspondence, shown in Table 1, between a transmit antenna identifier and a transmit beam identifier of the second station 1, and the first station and the second station 2 may include a correspondence, shown in Table 2, between a transmit antenna identifier and a transmit beam identifier of the second station 2. The transmit antenna 5 of the second station 1 may send data through a transmit beam 0 and a transmit beam 1. After beamforming training, it is learned that an optimal transmit beam of the transmit antenna 5 is the transmit beam 1. Therefore, the first station and the second station 1 may establish and store a correspondence, in Table 1, between an identifier of the transmit antenna 5 and an identifier of the transmit beam 1. Establishment of other correspondences in Table 1 and Table 2 is similar to that of the correspondence, in Table 1, between the identifier of the transmit antenna 5 and the identifier of the transmit beam 1, and details are not described herein. The first station and the second station store the correspondences shown in Table 1 and Table 2, so that the first station can send the transmit antenna identifier of the second station to the second station, to indicate a transmit beam used by the second station to send data. For example, the first station sends the identifier of the transmit antenna 5 to the second station. After receiving the identifier of the transmit antenna 5, the second station may determine, based on the correspondence in Table 1, that the identifier of the transmit antenna 5 corresponds to the identifier of the transmit beam 1, so that the second station sends the data to the first station through the transmit beam 1.

TABLE 1

| Transmit antenna identifier of a second station 1 | Transmit beam identifier of the second station 1 |
|---|---|
| Identifier of a transmit antenna 5 | Identifier of a transmit beam 1 |
| Identifier of a transmit antenna 6 | Identifier of a transmit beam 2 |

TABLE 2

| Transmit antenna identifier of a second station 2 | Transmit beam identifier of the second station 2 |
|---|---|
| Identifier of a transmit antenna 7 | Identifier of a transmit beam 3 |
| Identifier of a transmit antenna 8 | Identifier of a transmit beam 4 |

The following describes a correspondence between a transmit sector identifier and a transmit beam identifier of the second station.

The transmit sector identifier herein may be understood as a transmit beam set identifier. One transmit beam set may include one or more transmit beams, in other words, one transmit sector may include one or more transmit beams. The transmit beam identifier corresponding to the transmit sector identifier of the second station may be an optimal transmit beam in a transmit sector corresponding to the transmit sector identifier, or may not be an optimal transmit beam in a transmit sector corresponding to the transmit sector identifier. This is not limited in the embodiments of this application. The first station and the second station store the correspondence between the transmit sector identifier and the transmit beam identifier of the second station, to enable the first station can send the transmit sector identifier of the second station to the second station, to indicate a transmit beam used by the second station to send data.

The following describes the correspondence between the second AWV identifier and the second AWV of the second station.

An AWV is an attribute of an antenna. A transmit beam of the antenna may be configured by setting the AWV of the antenna. One AWV may correspond to one transmit beam. The first station and the second station store the correspondence between the second AWV identifier and the second AWV of the second station, to enable the first station can send the second AWV identifier of the second station to the second station, to indicate a transmit beam used by the second station to send data. For example, the first station may send the second AWV identifier of the second station to the second station. After receiving the second AWV identifier, the second station may configure, for an antenna of the second station, the second AWV corresponding to the second AWV identifier, to configure the transmit beam used by the second station to send the data to the first station.

The following describes the correspondence between the receive antenna identifier of the first station and the transmit beam identifier of the second station.

In the embodiments of this application, in the correspondence between the receive antenna identifier of the first station and the transmit beam identifier of the second station, a transmit beam corresponding to a receive antenna may be an optimal transmit beam obtained after beamforming training. Alternatively, a transmit beam corresponding to a receive antenna may not be an optimal transmit beam. This is not limited in the embodiments of this application. The first station and the second station store the correspondence between the receive antenna identifier of the first station and the transmit beam identifier of the second station, to enable the first station can send the receive antenna identifier of the first station to the second station, to indicate a transmit beam used by the second station to send data.

The following describes the correspondence between the receive sector identifier of the first station and the transmit beam identifier of the second station.

In the embodiments of this application, in the correspondence between the receive sector identifier of the first station and the transmit beam identifier of the second station, a transmit beam corresponding to a receive sector may be an optimal transmit beam obtained after beamforming training. Alternatively, a transmit beam corresponding to a receive sector may not be an optimal transmit beam. This is not limited in the embodiments of this application. The first station and the second station store the correspondence between the receive sector identifier of the first station and the transmit beam identifier of the second station, to enable the first station can send the receive sector identifier of the first station to the second station, to indicate a transmit beam used by the second station to send data.

The following describes the correspondence between the first AWV identifier of the first station and the transmit beam identifier of the second station.

In the embodiments of this application, in the correspondence between the first AWV identifier of the first station and the transmit beam identifier of the second station, a transmit beam corresponding to a first AWV may be an optimal transmit beam obtained after beamforming training. Alternatively, a transmit beam corresponding to a first AWV may not be an optimal transmit beam. This is not limited in the embodiments of this application. The first station and the second station store the correspondence between the first AWV identifier of the first station and the transmit beam identifier of the second station, to enable the first station can send the first AWV identifier of the first station to the second station, to indicate a transmit beam used by the second station to send data.

It should be noted that the correspondences shown in Table 1 and Table 2 are merely examples. It may be understood that a correspondence determined by the first station and the second station may alternatively be another correspondence, and a method for determining the correspondence is not limited to the beamforming training. This is not specifically limited in the embodiments of this application.

Figure 2:
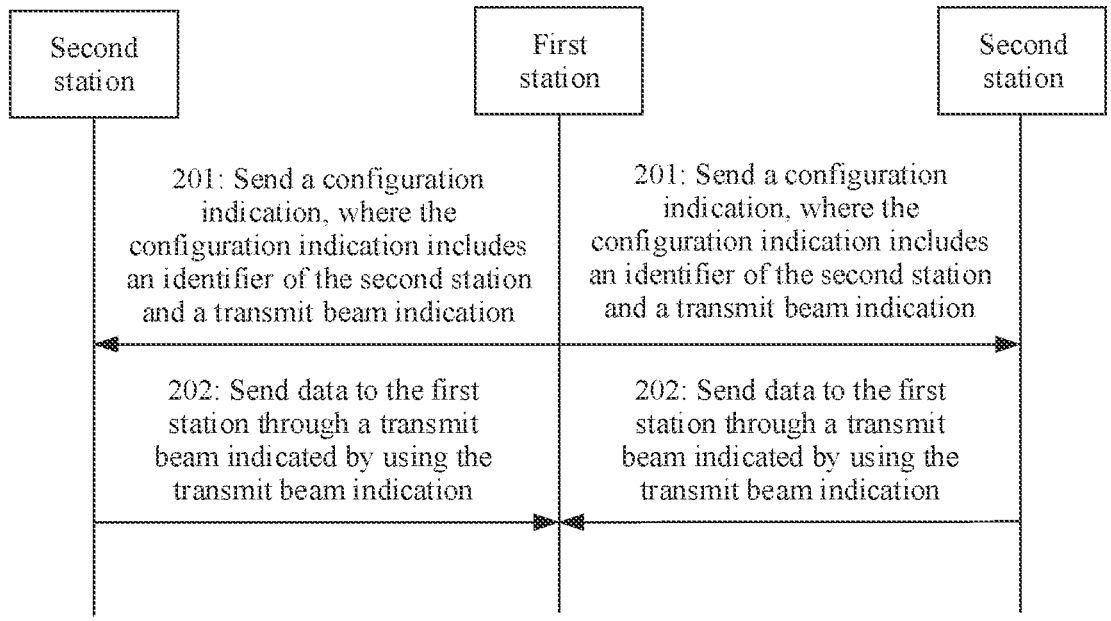
FIG. 2 is a schematic flowchart of a communication method according to an embodiment of this application.

FIG. 2 shows a communication method according to an embodiment of this application. As shown in FIG. 2, the communication method includes the following parts 201 and 202.

201: A first station sends one or more configuration indications.

Specifically, the first station may send configuration indications to a plurality of second stations, where one second station corresponds to one configuration indication. For example, the first station may send a configuration indication 1 to a second station 1, and send a configuration indication 2 to a second station 2. In this way, transmit beams of the plurality of second stations are centrally configured by the first station, and the first station can control the plurality of second stations. In a case, the first station may configure, for the plurality of second stations, a plurality of transmit beams having relatively weak mutual interference. This helps avoid beam interference between the plurality of second stations, and improve communication quality and transmission efficiency. Alternatively, the first station may send a configuration indication to one second station. This is not shown in FIG. 2. In FIG. 2, an example in which the first station sends configuration indications to two second stations is used.

Optionally, the first station is an AP, the second station is a STA, and the AP sends configuration indications to a plurality of STAs. In this way, the AP can control the plurality of STAs to perform uplink data transmission. Alternatively, the AP may send a configuration indication to one STA. In this way, the AP can control the STA to perform uplink data transmission.

Optionally, when the first station controls the plurality of second stations to perform data transmission, time periods in which the plurality of second stations send data may be completely or partially the same. In this way, data transmission efficiency can be improved. For example, in a scenario in which the AP controls the plurality of STAs to perform uplink data transmission, time periods in which the plurality of STAs send data may be the same. In addition, it should be noted that the same sending times in this embodiment of this application do not mean that there is no difference among the sending times in a strict sense, but mean that the sending times of the plurality of STAs may fluctuate within a specific time range.

The configuration indication corresponding to the second station includes an identifier of the second station and a transmit beam indication, and the transmit beam indication is used to indicate a transmit beam used by the second station to send data.

For example, the first station controls the plurality of second stations to perform data transmission. The first station sends the configuration indication 1 to the second station 1, where the configuration indication 1 includes an identifier of the second station 1 and a transmit beam indication 1, and sends the configuration indication 2 to the second station 2, where the configuration indication 2 includes an identifier of the second station 2 and a transmit beam indication 2. The transmit beam indication 1 is used to indicate a transmit beam used by the second station 1 to send data. The transmit beam indication 2 is used to indicate a transmit beam used by the second station 2 to send data.

For another example, the first station controls one second station to perform data transmission. The first station sends a configuration indication to the second station 1. The configuration indication includes an identifier of the second station 1 and a transmit beam indication 1 corresponding to the second station 1. The transmit beam indication 1 is used by the second station 1 to determine a transmit beam corresponding to the second station 1.

202: The second station sends the data to the first station through the transmit beam indicated by the transmit beam indication in the configuration indication.

In this embodiment of this application, after receiving the configuration indication, the second station sends the data to the first station through the transmit beam indicated by the transmit beam indication in the configuration indication.

For example, the first station controls the plurality of second stations to perform data transmission. The first station sends the configuration indication 1 to the second station 1, where the configuration indication 1 includes the identifier of the second station 1 and the transmit beam indication 1, and sends the configuration indication 2 to the second station 2, where the configuration indication 2 includes the identifier of the second station 2 and the transmit beam indication 2. After receiving the configuration indication 1, the second station 1 sends the data to the first station through a transmit beam 1 indicated by the transmit beam indication 1. Similarly, after receiving the configuration indication 2, the second station 2 sends the data to the first station through a transmit beam 4 indicated by the transmit beam indication 2. Correspondingly, the first station receives the data that is sent by the second station 1 through the transmit beam 1, and receives the data that is sent by the second station 2 through the transmit beam 4.

For another example, the first station controls one second station to perform data transmission. The first station sends the configuration indication to the second station 1. The configuration indication includes the identifier of the second station 1 and the transmit beam indication 1. After receiving the configuration indication, the second station 1 sends the data to the first station through a transmit beam 1 indicated by the transmit beam indication 1. Correspondingly, the first station receives the data that is sent by the second station 1 through the transmit beam 1.

It can be learned that based on implementation of the method described in FIG. 2, the first station can control and configure one or more second stations to perform data transmission.

In a first optional implementation, the transmit beam indication includes one or a combination of the following information: a transmit beam identifier, where the transmit beam identifier is used to indicate the transmit beam corresponding to the second station; a transmit antenna identifier, where the transmit antenna identifier is used to indicate a transmit antenna corresponding to the second station; a transmit sector identifier, where the transmit sector identifier is used to indicate a transmit sector corresponding to the second station; and a second AWV identifier, where the second AWV identifier is used to indicate an AWV corresponding to the second station. Based on this implementation, the first station can explicitly or implicitly indicate the transmit beam used by the second station to send the data.

If the transmit beam indication includes the transmit beam identifier, the first station explicitly indicates the transmit beam used by the second station to send the data. If the transmit beam indication includes the transmit antenna identifier, the transmit sector identifier, or the second AWV identifier, the first station implicitly indicates the transmit beam used by the second station to send the data.

The following describes in detail a specific implementation in which the transmit beam indication includes the transmit antenna identifier of the second station.

The transmit beam indication includes the transmit antenna identifier. The first station and the second station have learned of a correspondence between the transmit antenna identifier of the second station and the transmit beam identifier of the second station. For a description of the correspondence, refer to the description of the foregoing corresponding part. After determining the transmit beam that needs to be used by the second station to send the data, the first station may determine, based on the correspondence, the transmit antenna identifier that is of the second station and that corresponds to the transmit beam identifier, and send the identifier of the second station and the transmit antenna identifier of the second station to the second station. After receiving the transmit antenna identifier, the second station determines, based on the correspondence, the transmit beam that needs to be used by the second station to send the data, and sends the data to the first station through the determined transmit beam.

For example, the first station and the second station 1 have a correspondence between a transmit antenna identifier of the second station 1 and a transmit beam identifier of the second station 1. The correspondence may be shown in Table 1. The first station and the second station 2 have a correspondence between a transmit antenna identifier of the second station 2 and a transmit beam identifier of the second station 2. The correspondence may be shown in Table 2.

After determining that the second station 1 uses the transmit beam 1 to send the data, the first station determines, based on the correspondence shown in Table 1, that an identifier of the transmit beam 1 of the second station 1 corresponds to an identifier of a transmit antenna 5 of the second station 1. After determining that the second station 2 uses the transmit beam 4 to send the data, the first station determines, based on the correspondence shown in Table 2, that an identifier of the transmit beam 4 of the second station 2 corresponds to an identifier of a transmit antenna 8 of the second station 2. Therefore, the first station sends the identifier of the second station 1 and the identifier of the transmit antenna 5 to the second station 1, and sends the identifier of the second station 2 and the identifier of the transmit antenna 8 to the second station 2.

After receiving the identifier of the transmit antenna 5, the second station 1 determines, based on the correspondence shown in Table 1, that the identifier of the transmit antenna 5 corresponds to the identifier of the transmit beam 1. Therefore, the second station 1 sends the data to the first station through the transmit beam 1. After receiving the identifier of the transmit antenna 8, the second station 2 determines, based on the correspondence shown in Table 2, that the identifier of the transmit antenna 8 corresponds to the identifier of the transmit beam 4. Therefore, the second station 2 sends the data to the first station through the transmit beam 4.

The following describes in detail a specific implementation in which the transmit beam indication includes the transmit sector identifier of the second station.

The transmit beam indication includes the transmit sector identifier. The first station and the second station have learned of a correspondence between the transmit sector identifier of the second station and the transmit beam identifier of the second station. For a description of the correspondence, refer to the description of the foregoing corresponding part. After determining the transmit beam that needs to be used by the second station to send the data, the first station determines, based on the correspondence, the transmit sector identifier that is of the second station and that corresponds to the transmit beam identifier, and sends the identifier of the second station and the transmit sector identifier of the second station to the second station. After receiving the transmit sector identifier, the second station determines, based on the correspondence, the transmit beam that needs to be used by the second station to send the data.

An implementation principle of indicating, by the first station by using the transmit sector identifier, the transmit beam that needs to be used by the second station to send the data is similar to an implementation principle of indicating, by the first station by using the transmit antenna identifier, the transmit beam that needs to be used by the second station to send the data. No example is provided herein again.

The following describes in detail a specific implementation in which the transmit beam indication includes the second AWV identifier of the second station.

The transmit beam indication includes the second AWV identifier. The first station and the second station have learned of a correspondence between the second AWV identifier of the second station and a second AWV. For a description of the correspondence, refer to the description of the foregoing corresponding part. After determining the second AWV corresponding to the transmit beam that needs to be used by the second station to send the data, the first station determines, based on the correspondence, the second AWV identifier corresponding to the second AWV, and sends the identifier of the second station and the second AWV identifier to the second station. After receiving the second AWV identifier, the second station determines the second AWV based on the correspondence, and configures the second AWV for an antenna of the second station, to configure the transmit beam used by the second station to send the data to the first station.

In a second optional implementation, the transmit beam indication includes one or a combination of the following information: an antenna configuration number, where the antenna configuration number is used to indicate an antenna configuration of a station group to which the second station belongs; a spatial stream bitmap, where the spatial stream bitmap is used to indicate a spatial stream corresponding to the second station; and a reference signal identifier corresponding to the spatial stream of the second station, for example, an LTF identifier, a CEF identifier, a TRN identifier, or a pilot identifier, where the antenna configuration may include a correspondence between a transmit antenna and a transmit beam in the station group. Based on this implementation, the first station can implicitly indicate the transmit beam that needs to be used by the second station to send the data.

The following describes in detail a specific implementation in which the transmit beam indication includes the antenna configuration number.

The station group is a group of second stations, and one station group includes one or more second stations. For example, the station group may include the second station 1 and the second station 2.

One station group may have one or more antenna configurations, in other words, one station group has one or more correspondences between transmit antennas and transmit beams. Each antenna, configuration number of the station group corresponds to one antenna configuration of the station group. The first station and the second station have learned of a correspondence between the antenna configuration number and the antenna configuration of the station group.

For example, the station group includes the second station 1 and the second station 2. The correspondence between the antenna configuration number of the station group and the antenna configuration of the station group may be shown in Table 3,

TABLE 3

| Antenna configuration number | Antenna configuration |
|---|---|
| 01 | A transmit antenna 5 of a second station 1 corresponds to a transmit beam 1 of the second station 1 |
|  | A transmit antenna 8 of a second station 2 corresponds to a transmit beam 4 of the second station 2 |
| 02 | A transmit antenna 6 of the second station 1 corresponds to a transmit beam 2 of the second station 1 |
|  | A transmit antenna 7 of the second station 2 corresponds to a transmit beam 3 of the second station 2 |
| 03 | The transmit antenna 5 of the second station 1 corresponds to the transmit beam 1 of the second station 1 |
|  | The transmit antenna 7 of the second station 2 corresponds to the transmit beam 3 of the second station 2 |
| 04 | The transmit antenna 6 of the second station 1 corresponds to the transmit beam 2 of the second station 1 |
|  | The transmit antenna 8 of the second station 2 corresponds to the transmit beam 4 of the second station 2 |

After determining that the second station 1 uses the transmit beam 1 to send the data, the first station determines, based on the correspondence shown in Table 3, that the identifier of the transmit beam 1 corresponds to an antenna configuration number 01 and an antenna configuration number 03. After determining that the second station 2 uses the transmit beam 4 to send the data, the first station determines, based on the correspondence shown in Table 3, that the identifier of the transmit beam 4 corresponds to the antenna configuration number 01 and an antenna configuration number 04. Therefore, the first station sends the identifier of the second station 1 and the antenna configuration number 01 or the antenna configuration number 03 to the second station 1, and sends the identifier of the second station 2 and the antenna configuration number 01 or the antenna configuration number 04 to the second station 2.

After receiving the antenna configuration number 01 or the antenna configuration number 03, the second station 1 determines, based on the correspondence in Table 3, that the antenna configuration number 01 or the antenna configuration number 03 corresponds to the transmit beam 1 of the second station 1. Therefore, the second station 1 sends the data through the transmit beam 1. After the second station 2 receives the antenna configuration number 01 or the antenna configuration number 04, a case is similar to that of the second station 1. Details are not described herein.

Optionally, before the first station sends the one or more configuration indications, the first station sends the correspondence to the one or more second stations. The correspondence is the correspondence between the antenna configuration number and the antenna configuration of the station group. For example, before sending antenna configuration numbers to the second station 1 and the second station 2, the first station sends the correspondence of Table 3 to the second station 1 and the second station 2. Based on this implementation, the second station can learn of the correspondence between the antenna configuration number and the antenna configuration of the station group, to enable after receiving the antenna configuration number, the second station can determine an antenna configuration of the second station, and further determine the transmit beam corresponding to the second station.

The following describes in detail a specific implementation in which the transmit beam indication includes the spatial stream bitmap.

The spatial stream bitmap may be a string of bits. For example, the spatial stream bitmap is 01, and each bit location corresponds to one spatial stream. For example, the first bit 0 corresponds to a spatial stream 1, and the second bit 1 corresponds to a spatial stream 2. The spatial stream corresponding to a bit location that the bit value is 1 is a spatial stream that needs to be used by the second station.

In this implementation, the first station and the second station have learned of a correspondence between an identifier of a spatial stream and a transmit beam identifier of the second station. For example, a correspondence that is between an identifier of a spatial stream and a transmit beam identifier of the second station 1 and that has been learned in the first station and the second station 1 may be shown in Table 4. A correspondence that is between an identifier of a spatial stream and a transmit beam identifier of the second station 2 and that has been learned in the first station and the second station 2 may be shown in Table 5.

TABLE 4

| Identifier of a spatial stream | Transmit beam identifier of a second station 1 |
| --- | --- |
| Identifier of a spatial stream 1 | Identifier of a transmit beam 1 |
| Identifier of a spatial stream 2 | Identifier of a transmit beam 2 |

TABLE 5

| Identifier of a spatial stream | Transmit beam identifier of a second station 2 |
| --- | --- |
| Identifier of a spatial stream 1 | Identifier of a transmit beam 3 |
| Identifier of a spatial stream 2 | Identifier of a transmit beam 4 |

After determining that the second station 1 uses the transmit beam 1 to send the data, the first station determines, based on the correspondence shown in Table 4, the identifier of the transmit beam 1 corresponds to the identifier of the spatial stream 1. After determining that the second station 2 uses the transmit beam 4 to send the data, the first station determines, based on the correspondence shown in Table 5, the identifier of the transmit beam 4 corresponds to the identifier of the spatial stream 2. The first station sends a spatial stream bitmap 10 to the second station 1, and sends the spatial stream bitmap 01 to the second station 2. After receiving the spatial stream bitmap 10, the second station 1 determines the spatial stream 1 as a spatial stream that needs to be used. The second station 1 determines, based on the correspondence shown in Table 4, that the identifier of the spatial stream 1 corresponds to the identifier of the transmit beam 1. Therefore, the second station 1 sends the data through the transmit beam 1. After receiving the spatial stream bitmap 01, the second station 2 determines the spatial stream 2 as a spatial stream that needs to be used. The second station 2 determines, based on the correspondence shown in Table 5, that the identifier of the spatial stream 2 corresponds to the identifier of the transmit beam 4. Therefore, the second station 2 sends the data through the transmit beam 4.

The following describes in detail a specific implementation in which the transmit beam indication includes the reference signal identifier corresponding to the spatial stream.

The transmit beam indication includes the reference signal identifier corresponding to the spatial stream. The first station and the second station have learned of a correspondence 1 between a reference signal identifier and an identifier of a spatial stream, and a correspondence 2 between the identifier of the spatial stream and the transmit beam identifier of the second station. After determining the transmit beam that needs to be used by the second station to send the data, the first station determines, based on the correspondence 2, the identifier that is of the spatial stream and that corresponds to the transmit beam identifier. The first station determines, based on the correspondence 1, the reference signal identifier corresponding to the identifier of the spatial stream. And the first station sends the identifier of the second station and the reference signal identifier to the second station. After receiving the reference signal identifier, the second station determines the identifier of the spatial stream based on the correspondence 1. The second station determines, based on the correspondence 2, the transmit beam corresponding to the identifier of the spatial stream. And the second station sends the data to the first station through the transmit beam corresponding to the spatial stream identifier.

Optionally, in the first optional implementation and the second optional implementation, in addition to the transmit beam indication, the configuration indication may further include a receive beam indication of the first station. The receive beam indication of the first station includes one or a combination of the following information: a receive antenna identifier, where the receive antenna identifier is used to indicate a receive antenna of the first station; a receive sector identifier, where the receive sector identifier is used to indicate a receive sector of the first station; and a first AWV identifier, where the first AWV identifier is used to indicate an AWV of the first station. In this way, the second station may be notified of a receiving configuration used when the first station receives the data of the second station, to enable the second station performs a corresponding operation based on the receiving configuration of the first station.

In a third optional implementation, the first station may send the receiving configuration of the first station to the second station, so that the second station determines, based on the receiving configuration of the first station, the transmit beam that needs to be used by the second station to send the data. For example, the transmit beam indication includes one or a combination of the following information: the receive antenna identifier, where the receive antenna identifier is used to indicate the receive antenna of the first station; the receive sector identifier, where the receive sector identifier is used to indicate the receive sector of the first station; and the first AWV identifier, where the first AWV identifier is used to indicate the antenna weight vector AWV of the first station. Based on this implementation, the first station can implicitly indicate the transmit beam that needs to be used by the second station to send the data.

The following describes in detail a specific implementation in which the transmit beam indication includes the receive antenna identifier of the first station.

The transmit beam indication includes the receive antenna identifier. The first station and the second station have learned of a correspondence between the receive antenna identifier of the first station and the transmit beam identifier of the second station. For a description of the correspondence, refer to the description of the foregoing corresponding part. After determining the transmit beam that needs to be used by the second station to send the data, the first station determines, based on the correspondence, the receive antenna identifier that is of the first station and that corresponds to the transmit beam identifier, and sends the identifier of the second station and the receive antenna identifier of the first station to the second station. After receiving the receive antenna identifier, the second station determines, based on the correspondence, the transmit beam that needs to be used by the second station to send the data.

An implementation principle of indicating, by the first station by using the receive antenna identifier of the first station, the transmit beam that needs to be used by the second station to send the data is similar to an implementation principle of indicating, by the first station by using the transmit antenna identifier of the second station, the transmit beam that needs to be used by the second station to send the data. No example is provided herein again.

The following describes in detail a specific implementation in which the transmit beam indication includes the receive sector identifier of the first station.

The transmit beam indication includes the receive sector identifier. The first station and the second station have learned of a correspondence between the receive sector identifier of the first station and the transmit beam identifier of the second station. For a description of the correspondence, refer to the description of the foregoing corresponding part. After determining the transmit beam that needs to be used by the second station to send the data, the first station determines, based on the correspondence, the receive sector identifier that is of the first station and that corresponds to the transmit beam identifier, and sends the identifier of the second station and the receive sector identifier of the first station to the second station. After receiving the receive sector identifier, the second station determines, based on the correspondence, the transmit beam identifier corresponding to the second station.

An implementation principle of indicating, by the first station by using the receive sector identifier of the first station, the transmit beam that needs to be used by the second station to send the data is similar to an implementation principle of indicating, by the first station by using the transmit antenna identifier of the second station, the transmit beam that needs to be used by the second station to send the data. No example is provided herein again.

The following describes in detail a specific implementation in which the transmit beam indication includes the first AWV identifier of the first station.

The transmit beam indication includes the first AWV identifier. The first station and the second station have learned of a correspondence between the first AWV identifier of the first station and the transmit beam identifier of the second station. For a description of the correspondence, refer to the description of the foregoing corresponding part. After determining the transmit beam that needs to be used by the second station to send the data, the first station determines, based on the correspondence, the first AWV identifier that is of the first station and that corresponds to the transmit beam identifier, and sends the identifier of the second station and the first AWV identifier of the first station to the second station. After receiving the first AWV identifier, the second station determines, based on the correspondence, the transmit beam identifier corresponding to the second station.

An implementation principle of indicating, by the first station by using the first AWV identifier of the first station, the transmit beam that needs to be used by the second station to send the data is similar to an implementation principle of indicating, by the first station by using the transmit antenna identifier of the second station, the transmit beam that needs to be used by the second station to send the data. No example is provided herein again.

In an optional implementation, the configuration indication is carried in at least one PPDU, and the configuration indication is carried in one or more of the following information in the PPDU: a physical layer header, a MAC header, MAC frame content, and a control trailer (control trailer).

Figure 3:
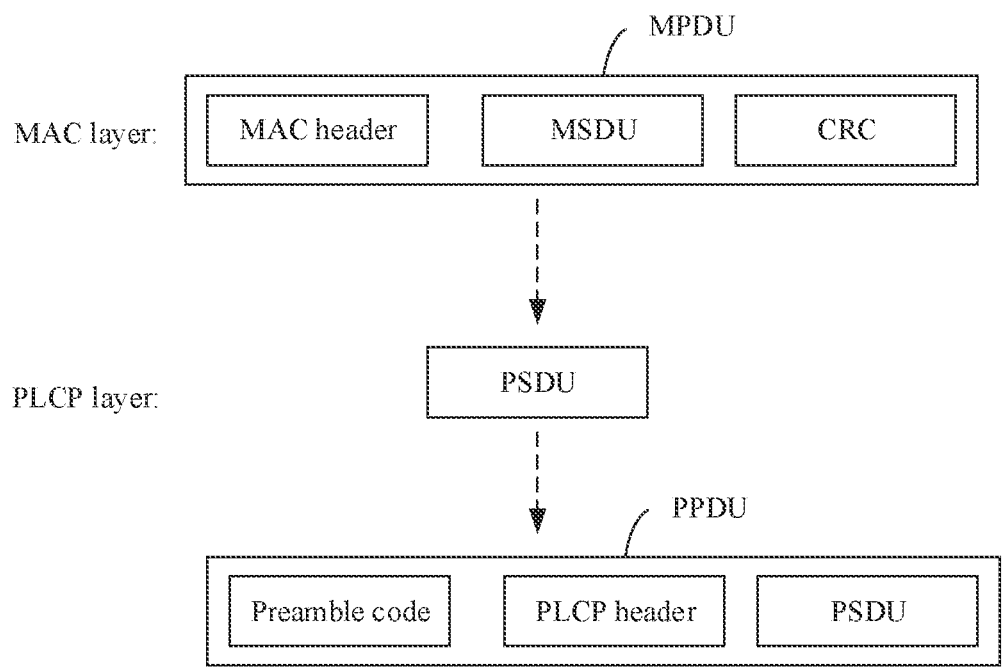
FIG. 3 is a schematic diagram of a PPDU forming process according to an embodiment of this application.

For ease of understanding, the following first describes a PPDU forming process. As shown in FIG. 3, a MAC header (MAC header) and a CRC are added to original to-be-sent data information MSDU at a MAC layer, to obtain an MPDU. The MPDU is sent to a PLCP sublayer at the MCA layer. The MPDU sent from the MAC layer is converted into a PSDU at the PLCP sublayer, and then PLCP header (PLCP Header) information and a preamble code (Preamble Code) are added to form a PPDU data frame structure. Therefore, one PPDU includes a preamble code, a PLCP header, and a PSDU. The PSDU includes a MAC header, an MSDU, and a CRC.

Figure 4:
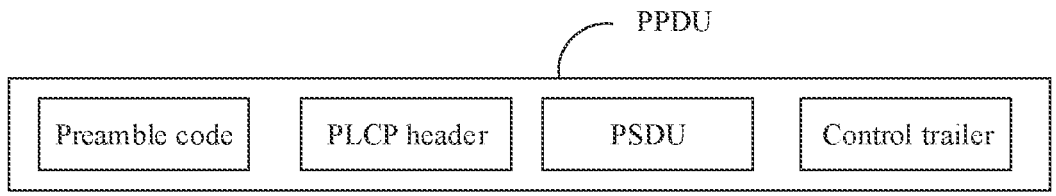
FIG. 4 is a schematic diagram of a PPDU according to an embodiment of this application.

The foregoing physical layer header may be a PLCP header. The foregoing MAC frame content may be an MSDU part. Optionally, one PPDU may further include a control trailer. As shown in FIG. 4, the control trailer is located at a tail of the PPDU. The control trailer is a signal that is in the PPDU and that is sent immediately following a data field. The control trailer may be one independent low density parity check (low density parity check. LDPC) codeword. For example, the LDPC codeword includes 18 data octets and 21 parity octets. The control trailer needs to be highly reliably transmitted and checked to avoid a control error. The control trailer may be modulated and encoded in a control mode.

Because a plurality of physical layer headers may be repeatedly sent, the configuration indication is carried in the physical layer header, thereby helping improve reliability of the configuration indication, and the configuration indication is carried in the physical layer header, thereby helping the second station obtain the configuration indication in advance, so that preparation time for sending data is more sufficient. The configuration indication is carried in the MAC header. Because a plurality of MAC headers may be repeatedly sent, the configuration indication is carried in the MAC header, thereby helping improve reliability of the configuration indication. The configuration indication is carried in the MAC frame content, so that a transmission bit can be flexibly allocated to the configuration indication, thereby helping reduce bit overheads. The configuration indication is carried in the control trailer, so that a data sending time of the second station can be conveniently determined.

The configuration indication may be carried in one of the physical layer header, the MAC header, the MAC frame content, and the control trailer, or the configuration indication may be split into a plurality of pieces and respectively carried in a plurality of pieces of information in the physical layer header, the MAC header, the MAC frame content, and the control trailer. For example, when the configuration indication includes the identifier of the second station, the transmit antenna identifier, the transmit sector identifier, and the second AWV identifier, the identifier of the second station and the transmit antenna identifier may be carried in the physical layer header, the transmit sector identifier may be carried in the MAC header, and the second AWV identifier may be carried in the MAC frame content.

Optionally, the configuration indication is carried in at least one PPDU in an A-PPDU. To be specific, the A-PPDU may include a plurality of PPDUs, and the configuration indication is carried in one or more PPDUs included in the A-PPDU.

For example, the A-PPDU includes three PPDUs. The configuration indication may be carried in the first PPDU in the A-PPDU. Alternatively, the configuration indication may be carried in the second PPDU in the A-PPDU. Alternatively, the configuration indication may be carried in the last PPDU in the A-PPDU. Alternatively, the configuration indication may be carried in the first PPDU and the second PPDU in the A-PPDU.

Optionally, the configuration indication is carried in a PPDU specified by a PLCP header of a PPDU in an A-PPDU. For example, the A-PPDU includes three PPDUs. If a PLCP header of the first PPDU specifies the second PPDU, the configuration indication is carried in the second PPDU. For another example, if a PLCP header of the first PPDU specifies the first PPDU, the configuration indication is carried in the first PPDU.

Optionally, the configuration indication is carried in a specific signal of a PPDU. The specific signal may be a TRN signal or an NDP signal.

Figure 5:
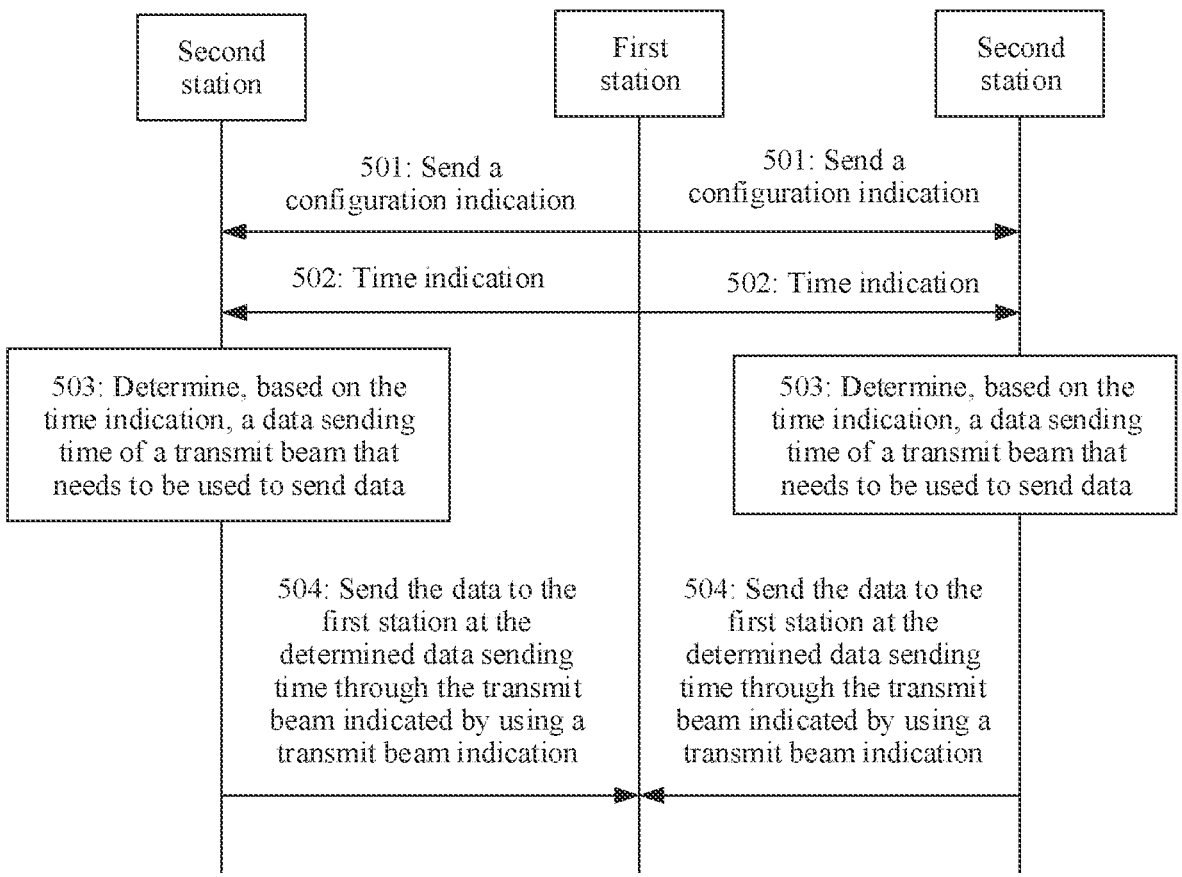
FIG. 5 is a schematic flowchart of another communication method according to an embodiment of this application.

FIG. 5 shows another communication method according to an embodiment of this application. As shown in FIG. 5, the communication method includes the following steps 501 to 504.

501: A first station sends one or more configuration indications.

502: The first station sends a time indication to one or more second stations.

The time indication is used to indicate a data sending time of a second station, or is used to indicate a data sending time of a transmit beam that needs to be used by a second station to send data.

503: The second station determines, based on the time indication, the data sending time of the transmit beam that needs to be used by the second station to send the data.

504: The second station sends the data to the first station at the determined data sending time through the transmit beam indicated by a transmit beam indication.

A specific implementation of step 501 is the same as the specific implementation of 201 in FIG. 2. For details, refer to the specific implementation of 201 in FIG. 2. Details are not described herein.

A configuration indication and a time indication may be sent in one frame, or may be sent in different frames. This is not limited in this embodiment of this application.

The following further describes the time indication.

When the time indication is used to indicate the data sending time of the second station, it may be understood that the data sending time of the second station is a data sending time of each transmit beam of the second station.

For example, a second station 1 includes a transmit beam 1 and a transmit beam 2. A second station 2 includes a transmit beam 3 and a transmit beam 4. The first station sends a time indication 1 and a configuration indication 1 to the second station 1, where the time indication 1 is used to indicate that a data sending time of the second station 1 is T1. The first station sends a time indication 2 and a configuration indication 2 to the second station 2, where the time indication 2 is used to indicate that a data sending time of the second station 2 is T2.

After receiving the time indication 1, the second station 1 determines, based on the time indication 1, that the data sending time of the second station 1 is T1. If the second station 1 determines, based on the configuration indication 1, that the second station 1 corresponds to the transmit beam 1, the second station 1 sends data to the first station at the data sending time T1 through the transmit beam 1. If the second station 1 determines, based on the configuration indication 1, that the second station 1 corresponds to the transmit beam 2, the second station 1 sends data to the first station at the data sending time T1 through the transmit beam 2. A case of the second station 2 is similar to that of the second station 1, and details are not described herein. T1 and T2 may be the same or may be different. This is not limited in this embodiment of this application.

For another example, the time indication is used to indicate the data sending time of the transmit beam that needs to be used by the second station to send the data. After the first station determines that the second station 1 uses the transmit beam 1 to send the data, the first station sends, to the second station 1, the data sending time T1 and the configuration indication 1 that correspond to the transmit beam 1. After the second station 1 determines, based on a transmit beam indication in the configuration indication 1, that the transmit beam 1 needs to be used to send the data, the second station 1 sends the data to the first station at the data sending time T1 through the transmit beam 1. A case of the second station 2 is similar to that of the second station 1, and details are not described herein.

The time indication may be used to explicitly indicate the data sending time of the second station, or may be used to explicitly indicate the data sending time of the transmit beam that needs to be used by the second station to send the data. In other words, the time indication is the data sending time of the second station, or the time indication is the data sending time of the transmit beam that needs to be used by the second station to send the data. Optionally, the time indication may include a data sending start time. Optionally, the time indication may include a time period. For example, the time indication may include a data sending start time and data sending duration, the time indication may include a data sending start time and a data sending end time, or the time indication may be in another form. Optionally, the time indication may include a plurality of time periods. For example, the time indication may include a data sending start time, data sending duration, and a data sending start periodicity, the time indication may include a data sending start time, data sending duration, and an interval between a data sending end time and a next data sending start time, or the time indication may be in another form.

The time indication may be alternatively used to implicitly indicate the data sending time of the second station, or implicitly indicate the data sending time of the transmit beam that needs to be used by the second station to send the data. For example, the time indication includes one or more of the following information: a first offset, a second offset, a third offset, a fourth offset, a downlink reference signal sequence used by the second station and a fifth offset, spatial stream allocation information of the second station, a sixth offset, and indication information used to indicate STF information.

For related descriptions of the first offset, the second offset, the third offset, the fourth offset, the downlink reference signal sequence used by the second station, the spatial stream allocation information of the second station, and the indication information used to indicate the STF information, refer to descriptions in Table 6.

TABLE 6

| Time indication | Description |
| --- | --- |
| First offset | The first offset is a time offset relative to a first preset interval. For example, a second station 1 may determine a data sending time T4 of a transmit beam corresponding to the second station 1 based on an end time T1 of a frame in which the time indication is located, a first preset interval T2, and the first offset T3 after receiving the first offset. T4 = T1 + T2 + T3. The second station 1 sends data to a first station at the data sending time T4 through the transmit beam corresponding to the second station 1. Optionally, the end time of the frame in which the time indication is located may be an energy end time of the frame in which the time indication is located. Optionally, the first preset interval may be a SIFS, an LBIFS, or a BRPIFS. |
| Second offset | The second offset is a time offset relative to a second preset interval. For example, the second station 1 may determine a data sending time T4 of the transmit beam corresponding to the second station 1 based on a time T1 at which the second station 1 sends data last time, a second preset interval T2, and the second offset T3 after receiving the second offset. T4 = T1 + T2 + T3. The second station 1 sends the data to the first station at the data sending time T4 through the transmit beam corresponding to the second station 1. Optionally, the second preset interval may be a SIFS, an LBIFS, or a BRPIFS. |
| Third offset | The third offset is a time offset relative to a third preset interval. For example, the first station may send a TRN signal to the second station 1 after sending, to the second station 1, a trigger frame used to trigger the second station 1 to send the data to the first station. The second station 1 may determine a data sending time T4 of the transmit beam corresponding to the second station 1 based on an end time T1 of the received TRN reference signal, a third preset interval T2, and the third offset T3 after receiving the third offset. T4 = T1 + T2 + T3. The second station 1 sends the data to the first station at the data sending time T4 through the transmit beam corresponding to the second station 1. Optionally, the third preset interval may be a SIFS, an LBIFS, or a BRPIFS. |
| Fourth offset | The fourth offset is a time offset relative to a fourth preset interval. For example, the second station 1 may determine a data sending time T4 of the transmit beam corresponding to the second station 1 based on an end time T1 of an acknowledgement frame, a fourth preset interval T2, and the fourth offset T3 after receiving the fourth offset. T4 = T1 + T2 + T3. The second station 1 sends the data to the first station at the data sending time T4 through the transmit beam corresponding to the second station 1. The acknowledgement frame is a frame that is sent by the first station to the second station 1 after the first station receives the data sent by the second station 1 and that is used to acknowledge receiving of the data sent by the second station 1. Optionally, the fourth preset interval may be a SIFS, an LBIFS, or a BRPIFS. |

TABLE 6-continued

| Time indication | Description |
|---|---|
| Downlink reference signal sequence used by a second station and fifth offset | Optionally, the downlink reference signal may be a CEF signal or an LTF signal.<br>For example, the second station 1 may determine a data sending time T4 of the transmit beam corresponding to the second station 1 based on an end time T1 of the CEF sequence, a fifth preset interval T2, and a fifth offset T3 after receiving a CEF sequence used by the second station 1. T4 = T1 + T2 + T3. The second station 1 sends the data to the first station at the data sending time T4 through the transmit beam corresponding to the second station 1.<br>Optionally, the fifth preset interval may be a SIFS, an LBIFS, or a BRPIFS. |
| Spatial stream allocation information of the second station and sixth offset | For example, the spatial stream allocation information of the second station may be that the second station 1 uses one spatial stream, and a second station 2 uses two spatial streams. The second station 1 may determine, based on a spatial stream allocation sequence and a quantity of allocated spatial streams, a downlink reference signal sequence (for example, a CEF or an LTF) used by the second station 1. Further, the second station 1 may determine a data sending time T4 of the transmit beam corresponding to the second station 1 based on an end time T1 of the downlink reference signal sequence, a sixth preset interval T2, and a sixth offset T3. T4 = T1 + T2 + T3. Optionally, the sixth preset interval may be a SIFS, an LBIFS, or a BRPIFS. |
| Indication information used to indicate STF information | This is used to indicate a quantity of repetition periodicities included in an STF field sent by the second station.<br>For example, after receiving the indication information used to indicate the STF information, the second station 1 may determine, based on the indication information used to indicate the STF information, the data sending time of the transmit beam corresponding to the second station 1.<br>Optionally, the second station 1 may further perform automatic gain control (automatic gain control, AGC) calibration or power calibration based on the indication information. |

It can be learned that based on the method described in FIG. 5, the first station can control and indicate the data sending time of the second station.

In an optional implementation, the first station may further send transmission control information to the one or more second stations. The transmission control information includes one or more of the following information: first indication information, second indication information, third indication information, fourth indication information, fifth indication information, sixth indication information, seventh indication information, eighth indication information, ninth indication information, tenth indication information, and eleventh indication information. Another parameter of the second station can be controlled by sending the transmission control information to the one or more second stations.

For related descriptions of the first indication information to the eleventh indication information, refer to descriptions in Table 7,

TABLE 7

| Transmission control information | Description |
|---|---|
| First indication information | The first indication information is used to indicate a data transmission rate of a second station. After receiving the first indication information, the second station determines the data transmission rate of the second station based on the first indication information, and sends data to a first station by using the data transmission rate. |
| Second indication information | The second indication information is used to indicate an SM manner of the second station. After receiving the second indication information, the second station determines the SM manner of the second station based on the second indication information. The second station sends the data in the determined SM manner. |
| Third indication information | The third indication information is used to indicate whether the second station uses an STBC scheme. After receiving the third indication information, the second station determines, based on the third indication information, whether the second station uses the STBC scheme. |
| Fourth indication information | The fourth indication information is used to indicate whether the second station uses a DCM scheme. After receiving the fourth indication information, the second station determines, based on the fourth indication information, whether the second station uses the DCM scheme. |
| Fifth indication information | The fifth indication information is used to indicate spatial stream mapping. After receiving the fifth indication information, the second station determines the spatial stream mapping based on the fifth indication information. |

TABLE 7-continued

| Transmission control information | Description |
| --- | --- |
| Sixth indication information | The sixth indication information is used to indicate transmission content of the second station. After receiving the sixth indication information, the second station determines the transmission content of the second station based on the sixth indication information, and transmits the data to the first station based on the determined transmission content. |
| Seventh indication information | The seventh indication information is used to indicate a transmission bandwidth of the second station. After receiving the seventh indication information, the second station determines the transmission bandwidth of the second station based on the seventh indication information, and transmits the data to the first station by using the determined transmission bandwidth. |
| Eighth indication information | The eighth indication information is used to indicate a PPDU format of the second station. After receiving the eighth indication information, the second station determines the PPDU format of the second station based on the eighth indication information, and transmits the data to the first station based on the determined PPDU format. |
| Ninth indication information | The ninth indication information is used to indicate transmit opportunity duration of the second station. After receiving the ninth indication information, the second station determines the transmit opportunity duration of the second station based on the ninth indication information. |
| Tenth indication information | The tenth indication information is used to indicate TRN information of the second station. For example, the TRN information may comprise parameters P, M, and N of TRN, and allocation information of a TRN reference signal sequence of the second station. The TRN reference signal sequence is used for a reference signal of beam training. After receiving the TRN information, the second station may send the TRN reference signal sequence to the first station based on the TRN information. After receiving the TRN reference signal sequence, the first station may measure a signal strength or a channel state parameter. |
| Eleventh indication information | The eleventh indication information is used to indicate a transmit power of the second station. After receiving the eleventh indication information, the second station determines the transmit power of the second station based on the eleventh indication information, and sends the data to the first station based on the transmit power. |

In an optional implementation, a plurality of pieces of indication information in the transmission control information may be sent carried in one frame, or a plurality of pieces of indication information in the transmission control information may be sent carried in a plurality of frames respectively.

In an optional implementation, the configuration indication, the time indication, and the transmission control information may be carried in a same frame. Alternatively, the configuration indication, the time indication, and the transmission control information may not be carried in a same frame. For example, the configuration indication, the time indication, and the transmission control information may be carried in three different frames. Alternatively, the configuration indication and the time indication may be carried in a same frame, and the transmission control information is carried in another frame. Alternatively, the configuration indication and the transmission control information may be carried in a same frame, and the time indication is carried in another frame. Alternatively, the transmission control information and the time indication may be carried in a same frame, and the configuration indication is carried in another frame.

In an optional implementation, the first station may further send, to the one or more second stations, indication information used to indicate a manner of sending an acknowledgement frame. Correspondingly, the second station may receive the indication information that is sent by the first station and that is used to indicate the manner of sending the acknowledgement frame, and determine, based on the indication information, the manner of sending the acknowledgement frame. For example, the acknowledgement frame may be sent in a TDM manner or an SDM manner.

In this implementation, the second station needs to enter a receiving mode after data sending is completed, and the second station needs to perform receiving preparation based on the manner of sending the acknowledgement frame by the first station, to receive the acknowledgement frame sent by the first station. Therefore, implementing this implementation helps the second station successfully receive the acknowledgement frame.

Figure 6:
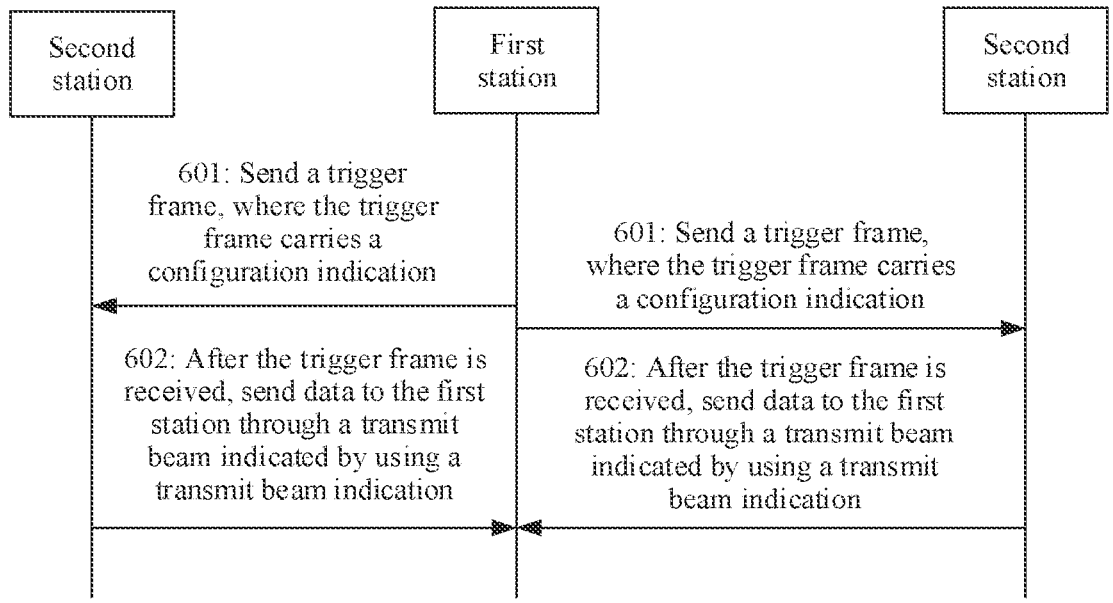
FIG. 6 is a schematic flowchart of still another communication method according to an embodiment of this application.

FIG. 6 shows still another communication method according to an embodiment of this application. As shown in FIG. 6, the communication method includes the following steps 601 and 602.

601: A first station sends a trigger frame to one or more second stations, where the trigger frame carries a configuration indication.

The configuration indication includes an identifier of a second station and a transmit beam indication, and the transmit beam indication is used to indicate a transmit beam that needs to be used by the second station to send data. For specific descriptions of the configuration indication, refer to corresponding descriptions in the foregoing method embodiments. Details are not described herein. The trigger frame is used to trigger the second station to send the data to the first station through the transmit beam indicated by the transmit beam indication.

602: After receiving the trigger frame, the second station sends the data to the first station through the transmit beam indicated by the transmit beam indication.

Optionally, the trigger frame may further carry a time indication, and after receiving the trigger frame, the second station determines a data sending time based on the time indication, and sends the data to the first station at the determined data sending time. For specific descriptions of how to determine the data sending time based on the time indication, refer to the descriptions corresponding to FIG. 5. Details are not described herein. Alternatively, the trigger frame may not carry a time indication, and the second station sends the data to the first station after a preset time interval starting from a time point at which the second station receives the trigger frame. The preset time interval may be agreed on in a protocol, for example, may be a SIFS, an LBIFS, or a BRPIFS. Based on the method described in FIG. 6, the first station may indicate the transmit beam of the second station by the trigger frame, and can trigger the second station to send the data through the corresponding transmit beam by the trigger frame.

In an optional implementation, the configuration indication of the trigger frame further carries a receiving configuration indication. The receiving configuration indication is used to indicate a receive beam that needs to be used by the second station to receive a target frame. After receiving the receiving configuration indication, the second station determines the receive beam based on the receiving configuration indication, and receives the target frame through the receive beam. For example, the target frame may be an ACK frame, a response frame, a trigger frame other than the current trigger frame, or the like. Based on this implementation, a receiving space configuration of the trigger frame other than the current trigger frame, the ACK frame, or the response frame may be indicated to the second station in advance by using the trigger frame, so that the second station can prepare in advance to receive the trigger frame other than the current trigger frame, the ACK frame, or the response frame.

Figure 7:
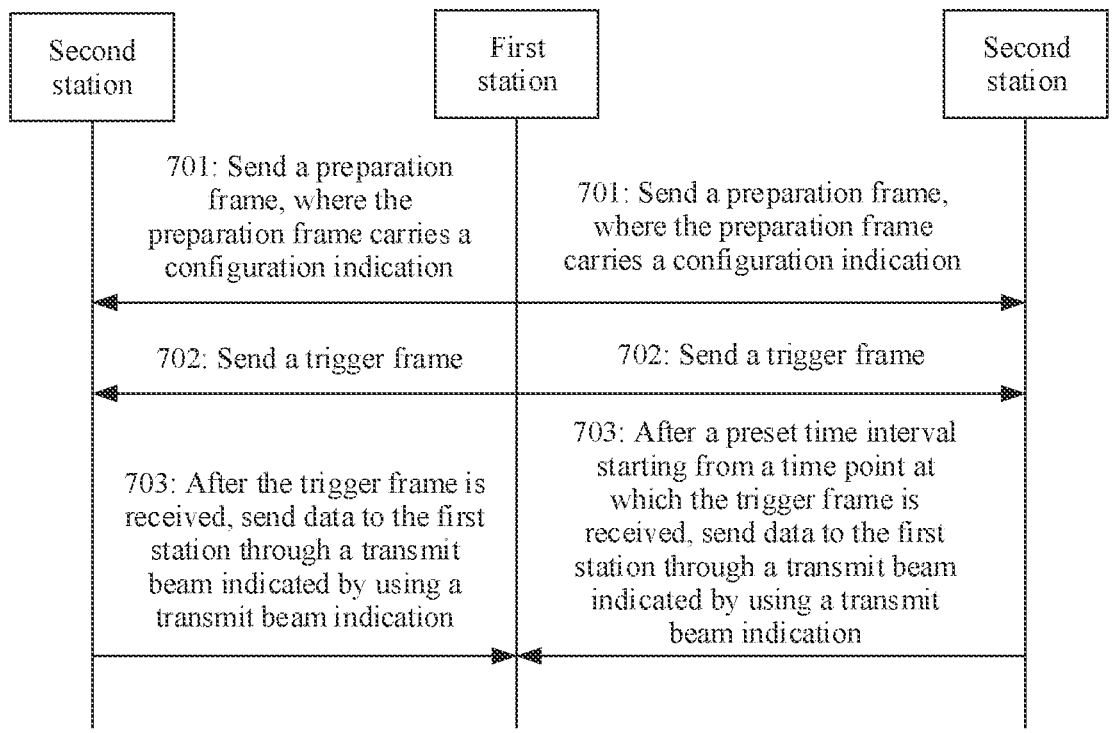
FIG. 7 is a schematic flowchart of yet another communication method according to an embodiment of this application.

FIG. 7 shows yet another communication method according to an embodiment of this application. As shown in FIG. 7, the communication method includes the following steps 701 to 703.

701: A first station sends a preparation frame to one or more second stations, where the preparation frame carries a configuration indication.

The configuration indication includes an identifier of a second station and a transmit beam indication, and the transmit beam indication is used to indicate a transmit beam that needs to be used by the second station to send data. For specific descriptions of the configuration indication, refer to corresponding descriptions in the foregoing method embodiments. Details are not described herein.

702: The first station sends a trigger frame to the one or more second stations.

After the first station sends the preparation frame to the one or more second stations, the first station sends the trigger frame to the one or more second stations. The trigger frame is used to trigger the second station to send the data to the first station through the transmit beam indicated by the transmit beam indication.

703: After receiving the trigger frame, the second station sends the data to the first station through the transmit beam indicated by the transmit beam indication.

Based on the method described in FIG. 7, the first station may indicate the transmit beam of the second station in advance by using the preparation frame, so that the second station can have sufficient time to configure the transmit beam.

In an optional implementation, the preparation frame further carries a receiving configuration indication of a target frame. The receiving configuration indication is used to indicate a receive beam that needs to be used by the second station to receive the target frame. After receiving the receiving configuration indication, the second station determines the receive beam based on the receiving configuration indication, and receives the target frame through the receive beam. For example, the target frame may be an ACK frame, a response frame, a trigger frame other than the current trigger frame, or the like. Based on this implementation, a receiving space configuration of the trigger frame, the ACK frame, or the response frame may be indicated to the second station in advance by using the preparation frame, so that the second station can prepare in advance to receive the trigger frame, the ACK frame, or the response frame.

The foregoing describes in detail the communication methods according to the embodiments of this application, and the following describes wireless communications apparatuses according to the embodiments of this application.

In the embodiments of the present invention, functional modules of the apparatus may be obtained through division according to the foregoing method examples. For example, the functional modules may be obtained through division based on corresponding functions, or two or more functions may be integrated into one module. The foregoing integrated module may be implemented in a form of hardware, or may be implemented in a form of a software functional module. It should be noted that, in the embodiments of the present invention, division into the modules is an example, and is merely logical function division. In actual implementation, another division manner may be used.

Figure 8:
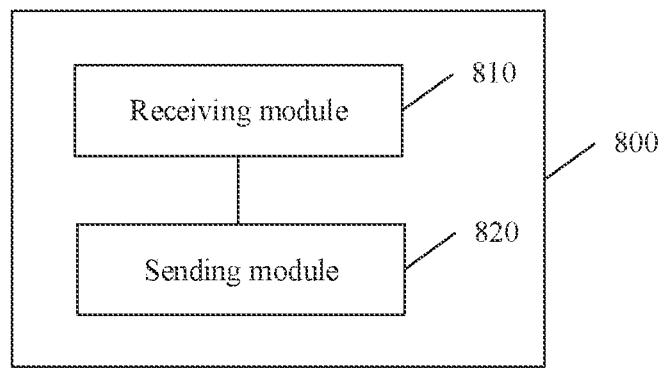
FIG. 8 is a schematic structural diagram of a wireless communications apparatus according to an embodiment of this application.

In an example, FIG. 8 is a schematic block diagram of a wireless communications apparatus 800 according to an embodiment of this application. The apparatus 800 in this embodiment of this application may be the first station in the foregoing method embodiments, or may be one or more chips in the first station. The apparatus 800 may be configured to perform some or all functions of the first station in the foregoing method embodiments. The apparatus 800 may include a receiving module 810 and a sending module 820.

The receiving module 810 may be configured to implement a receiving action on a first station side in the foregoing method embodiments. For example, the receiving module 810 may receive the data sent in step 202 in FIG. 2. The receiving module 810 may receive the data sent in step 504 in FIG. 5. The receiving module 810 may receive the data sent in step 602 in FIG. 6. The receiving module 810 may receive the data sent in step 703 in FIG. 7.

The sending module 820 may be configured to implement a sending action on the first station side in the foregoing method embodiments. For example, the sending module 820 may be configured to perform step 201 in FIG. 2. The sending module 820 may be configured to perform steps 501 and 502 in FIG. 5. The sending module 820 may be configured to perform step 601 in FIG. 6. The sending module 820 may be configured to perform steps 701 and 702 in FIG. 7.

Figure 9:
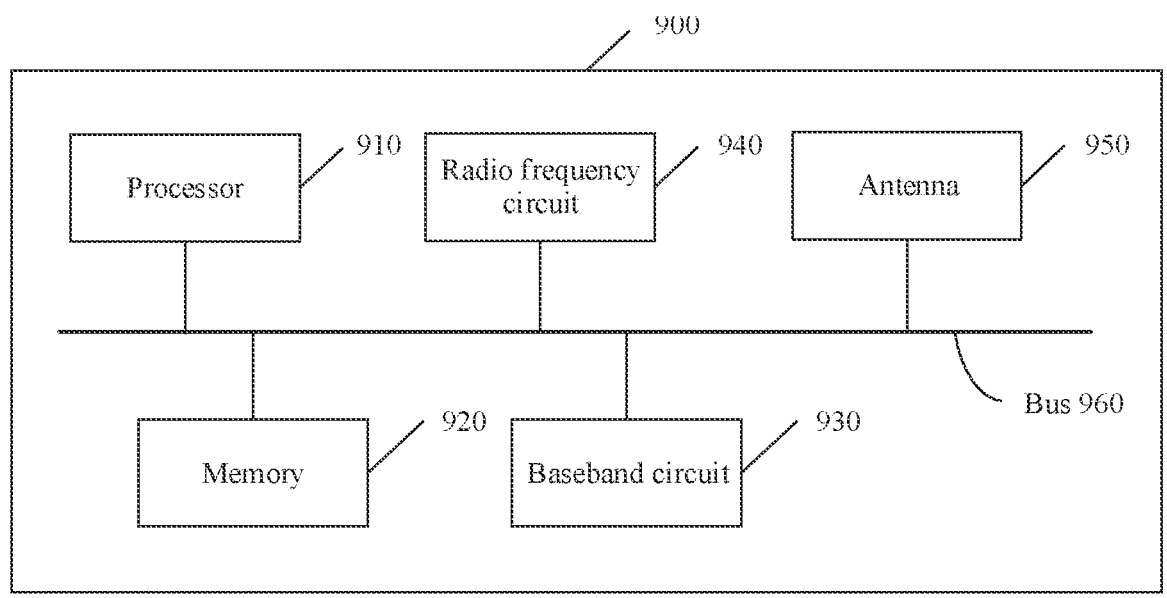
FIG. 9 is a schematic structural diagram of another wireless communications apparatus according to an embodiment of this application.

In another example, FIG. 9 is a schematic block diagram of another wireless communications apparatus 900 according to an embodiment of this application. The apparatus 900 in this embodiment of this application may be the first station in the foregoing method embodiments, and the apparatus 900 may be configured to perform some or all functions of the first station in the foregoing method embodiments. The apparatus 900 may include a processor 910, a memory 920, a baseband circuit 930, a radio frequency circuit 940, and one or more antennas 950. Optionally, components of the apparatus 900 are coupled together by using a bus 960. In addition to a data bus, the bus 960 comprises a power bus, a control bus, and a status signal bus. However, for clear description, various types of buses in the figure are marked as the bus 960.

The processor 910 may be configured to control the first station, and is configured to perform processing performed by the first station in the foregoing embodiments. The processor 910 may perform a processing process related to the first station in the foregoing method embodiments and/or another process used for the technology described in this application. Further, the processor 910 may run an operating system, is responsible for managing the bus, and may execute a program or an instruction stored in the memory.

The baseband circuit 930, the radio frequency circuit 940, and the antenna 950 may be configured to support information receiving and sending between the first station and the second station in the foregoing embodiments, to support wireless communication between the first station and the second station. In an example, data sent by the second station is received by the antenna 950. Then, the data is processed by the radio frequency circuit through processing such as filtering, amplification, down-conversion, and digitization; processed by the baseband circuit through baseband processing such as decoding and protocol-based data decapsulation; and then processed by the processor 910. In another example, a configuration indication of the first station may be processed by the processor 910; processed by the baseband circuit 930 through baseband processing such as protocol-based encapsulation and encoding; processed by the radio frequency circuit 940 through radio frequency processing such as analog conversion, filtering, amplification, and up-conversion; and transmitted through the antenna 950. It may be understood that the baseband circuit 930, the radio frequency circuit 940, and the antenna 950 may be further configured to support the first station in communicating with another network entity.

The memory 920 may be configured to store program code and data of the first station. It may be understood that FIG. 9 merely shows a simplified design of the first station. During actual application, for example, the first station may include any quantity of transmitters, receivers, processors, memories, antennas, and the like, and all first stations that can implement the present invention fall within the protection scope of the present invention.

In a possible implementation, the wireless communications apparatus 900 may alternatively be implemented by using the following, one or more field-programmable gate arrays (field-programmable gate array, FPGA), a programmable logic device (programmable logic device, PLD), a controller, a state machine, gate logic, a discrete hardware component, any other proper circuit, or any combination of circuits that can perform various functions described in this application.

In still another example, an embodiment of this application further provides a computer storage medium. The computer storage medium may store a program instruction used to indicate any one of the foregoing methods, so that a processor executes the program instruction to implement the method and the function of the first station in the foregoing method embodiments.

Figure 10:
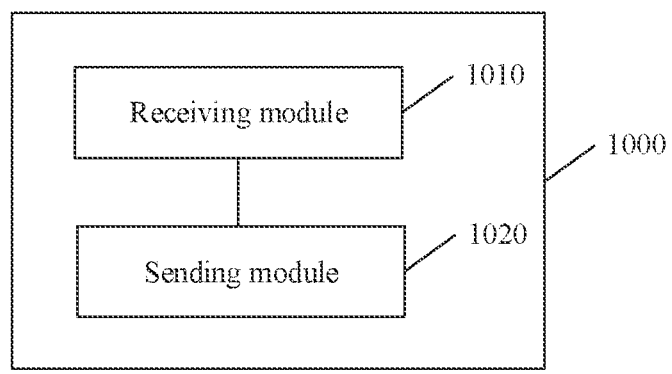
FIG. 10 is a schematic structural diagram of still another wireless communications apparatus according to an embodiment of this application.

In an example, FIG. 10 is a schematic block diagram of a wireless communications apparatus 1000 according to an embodiment of this application. The apparatus 1000 in this embodiment of this application may be the second station in the foregoing method embodiments, or may be one or more chips in the second station. The apparatus 1000 may be configured to perform some or all functions of the second station in the foregoing method embodiments. The apparatus 1000 may include a receiving module 1010 and a sending module 1020.

The receiving module 1010 may be configured to implement a receiving action on a second station side in the foregoing method embodiments. For example, the receiving module 1010 may receive the data sent in step 201 in FIG. 2. The receiving module 1010 may receive the data sent in steps 501 and 502 in FIG. 5. The receiving module 1010 may receive the data sent in step 601 in FIG. 6. The receiving module 1010 may receive the data sent in steps 701 and 702 in FIG. 7.

The sending module 1020 may be configured to implement a sending action on the second station side in the foregoing method embodiments. For example, the sending module 1010 may be configured to perform step 202 in FIG. 2. The sending module 1020 may be configured to perform step 504 in FIG. 5. The sending module 1020 may be configured to perform step 602 in FIG. 6. The sending module 1020 may be configured to perform step 703 in FIG. 7.

Figure 11:
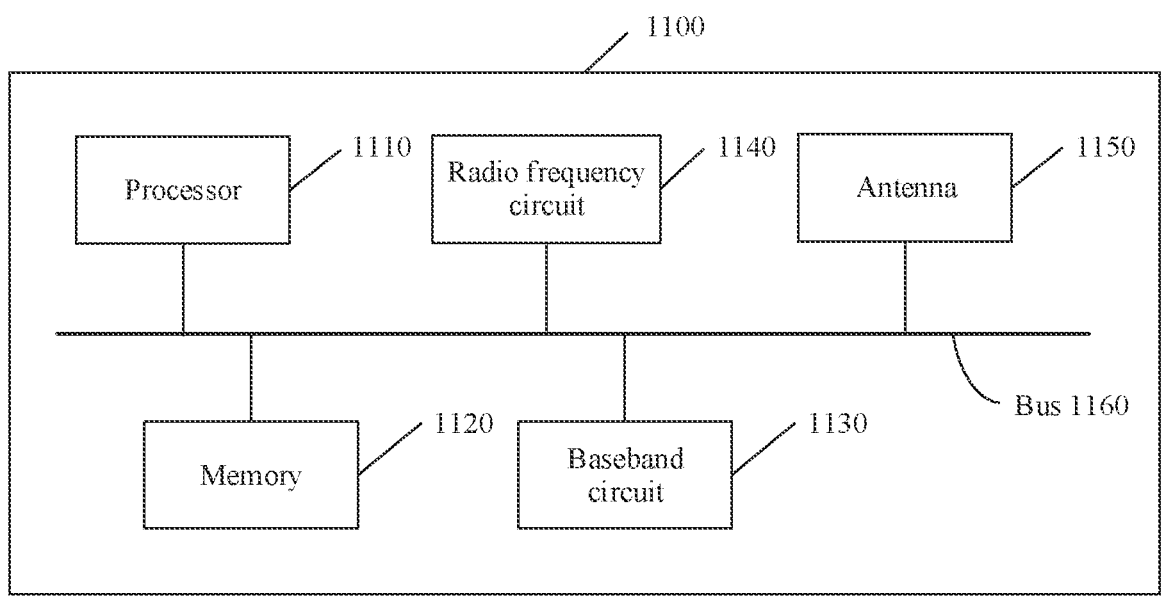
FIG. 11 is a schematic structural diagram of yet another wireless communications apparatus according to an embodiment of this application.

In another example, FIG. 11 is a schematic block diagram of another wireless communications apparatus 1100 according to an embodiment of this application. The apparatus 1100 in this embodiment of this application may be the second station in the foregoing method embodiments, and the apparatus 1100 may be configured to perform some or all functions of the second station in the foregoing method embodiments. The apparatus 1100 may include a processor 1110, a memory 1120, a baseband circuit 1130, a radio frequency circuit 1140, and one or more antennas 1150. Optionally, components of the apparatus 1100 are coupled together by using a bus 1160. In addition to a data bus, the bus system 1160 includes a power bus, a control bus, and a status signal bus. However, for clear description, various types of buses in the figure are marked as the bus system 1160.

The processor 1110 may be configured to control the second station, and is configured to perform processing performed by the second station in the foregoing embodiments. The processor 1110 may perform a processing process related to the second station in the foregoing method embodiments and/or another process used for the technology described in this application. Further, the processor 1110 may run an operating system, is responsible for managing the bus, and may execute a program or an instruction stored in the memory.

The baseband circuit 1130, the radio frequency circuit 1140, and the antenna 1150 may be configured to support information receiving and sending between the second station and the first station in the foregoing embodiments, to support wireless communication between the second station and the first station. In an example, a configuration indication sent by the first station is received by the antenna 1150. Then, the configuration indication is processed by the radio frequency circuit through processing such as filtering, amplification, down-conversion, and digitization; processed by the baseband circuit through baseband processing such as decoding and protocol-based data decapsulation; and then processed by the processor 1110. In another example, data of the first station may be processed by the processor 1110; processed by the baseband circuit 1130 through baseband processing such as protocol-based encapsulation and encoding; processed by the radio frequency circuit 1140 through radio frequency processing such as analog conversion, filtering, amplification, and up-conversion; and transmitted through the antenna 1150. It may be understood that the baseband circuit 1130, the radio frequency circuit 1140, and the antenna 1150 may be further configured to support the second station in communicating with another network entity.

The memory 1120 may be configured to store program code and data of the second station, and the memory 1120 may be the storage module 1040 in FIG. 10. It may be understood that FIG. 11 merely shows a simplified design of the second station. During actual application, for example, the second station may include any quantity of transmitters, receivers, processors, memories, antennas, and the like, and all second stations that can implement the present invention fall within the protection scope of the present invention.

In a possible implementation, the wireless communications apparatus 1100 may alternatively be implemented by using the following: one or more field-programmable gate arrays (field-programmable gate array, FPGA), a programmable logic device (programmable logic device, PLD), a controller, a state machine, gate logic, a discrete hardware component, any other proper circuit, or any combination of circuits that can perform various functions described in this application.

In still another example, an embodiment of this application further provides a computer storage medium. The computer storage medium may store a program instruction used to indicate any one of the foregoing methods, so that a processor executes the program instruction to implement the method and the function of the second station in the foregoing method embodiments.

Each of the processors in the apparatus 900 and the apparatus 1100 may be a general-purpose processor, for example, a general-purpose central processing unit (CPU), a network processor (network processor, NP), or a microprocessor, or may be an application-specific integrated circuit (application-specific integrated circuit, ASIC), or one or more integrated circuits configured to control program execution in the solutions in this application. Alternatively, the processor may be a digital signal processor (digital signal processor, DSP), a field-programmable gate array (field-programmable gate array. FPGA) or another programmable logic device, a discrete gate or a transistor logic device, or a discrete hardware component. Alternatively, the controller/processor may be a combination of processors implementing a computing function, for example, a combination of one or more microprocessors, or a combination of a DSP and a microprocessor. The processor usually performs logical and arithmetic operations based on a program instruction stored in a memory.

Each of the memories in the apparatus 900 and the apparatus 1100 may further store an operating system and another application program. Specifically, the program may include program code, and the program code includes a computer operation instruction. More specifically, the memory may be a ROM, another type of static storage device that can store static information and an instruction, a RAM, another type of dynamic storage device that can store information and an instruction, a magnetic disk memory, or the like. The memory may be a combination of the foregoing memories. In addition, the computer-readable storage medium/memory may be located in the processor, or may be located outside the processor, or distributed in a plurality of entities including a processor or a processing circuit. The computer-readable storage medium/memory may be specifically embodied in a computer program product. For example, the computer program product may include a computer-readable medium in a packaging material.

An embodiment of this application further provides an apparatus, which may be a chip system. The chip system includes a processor, configured to support a first station or a second station to implement a function in the foregoing embodiments, for example, generate or process data and/or information in the foregoing methods.

In a possible design, the chip system may further include a memory, and the memory is configured to store a necessary program instruction and necessary data. The chip system may include a chip, or may include a chip and another discrete component.

An embodiment of this application further provides a processor, configured to be coupled to a memory. The processor is configured to perform the method and the function of the first station or the second station in any one of the foregoing embodiments.

An embodiment of this application further provides a computer program product including an instruction. When the computer program product runs on a computer, the computer is enabled to perform the method and the function of the first station or the second station in any one of the foregoing embodiments.

In the foregoing embodiments, the description of each embodiment has respective focuses. For a part that is not described in detail in an embodiment, refer to related descriptions in other embodiments.

Finally, it should be noted that the foregoing embodiments are merely intended for describing the technical solutions in this application instead of limiting this application. Although this application is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions in the embodiments of this application.

What is claimed is:

1. A communication method, comprising:
determining, by a first station, one or more configuration indications based on a correspondence between a plurality of antenna configuration numbers and a plurality of corresponding antenna configurations, wherein each antenna configuration number corresponds to a different antenna configuration for one or more second stations, wherein one configuration indication in the one or more configuration indications corresponds to one second station in the one or more second stations, wherein the configuration indication comprises an identifier of the second station and a transmit beam indication, wherein the transmit beam indication is used to indicate a transmit beam used by the second station to send data, and wherein the identifier of the second station is used to indicate the second station;
sending, by the first station to the one or more second stations, the correspondence between the plurality of antenna configuration numbers and the plurality of corresponding antenna configurations;
after sending the correspondence between the plurality of antenna configuration numbers and the plurality of corresponding antenna configurations, sending, by the first station, the one or more configuration indications to the one or more second stations, wherein the configuration indication is carried in a trigger frame, and wherein the trigger frame triggers the second station to send data through the transmit beam indicated by the transmit beam indication; and receiving, by the first station, data that is separately sent by the one or more second stations through one or more transmit beams indicated by using one or more transmit beam indications.

2. The method according to claim 1, wherein the transmit beam indication comprises at least one of the following information:
 a transmit beam identifier, wherein the transmit beam identifier is used to indicate the transmit beam corresponding to the second station;
 a transmit antenna identifier, wherein the transmit antenna identifier is used to indicate a transmit antenna corresponding to the second station;
 a transmit sector identifier, wherein the transmit sector identifier is used to indicate a transmit sector corresponding to the second station; or
 a second antenna weight vector (AWV) identifier, wherein the second AWV identifier is used to indicate an AWV corresponding to the second station.

3. The method according to claim 1, wherein the transmit beam indication comprises at least one of the following information:
 an antenna configuration number, wherein the antenna configuration number is used to indicate an antenna configuration of a station group to which the second station belongs, and wherein the antenna configuration comprises a correspondence between a transmit antenna and a transmit beam in the station group; or
 a spatial stream bitmap, wherein the spatial stream bitmap is used to indicate a spatial stream corresponding to the second station.

4. The method according to claim 1, wherein the configuration indication further comprises a receive beam indication, and wherein the receive beam indication comprises at least one of the following information:
 a receive antenna identifier, wherein the receive antenna identifier is used to indicate a receive antenna of the first station;
 a receive sector identifier, wherein the receive sector identifier is used to indicate a receive sector of the first station; or
 a first antenna weight vector (AWV) identifier, wherein the first AWV identifier is used to indicate an AWV of the first station.

5. The method according to claim 1, wherein the configuration indication is carried in at least one physical layer protocol data unit (PPDU), and wherein the configuration indication is carried in one or more of the following information in the PPDU: a physical layer header, a media access control header, media access control frame content, or a control trailer.

6. A communication method, comprising:
 receiving, by a second station, a correspondence between a plurality of antenna configuration numbers and a plurality of corresponding antenna configurations sent by a first station, wherein each antenna configuration number corresponds to a different antenna configuration for one or more second stations;
 after receiving the correspondence between the plurality of antenna configuration numbers and the plurality of corresponding antenna configurations, receiving, by the second station, a configuration indication sent by the first station, wherein the configuration indication comprises an identifier of the second station, wherein the configuration indication is carried in a trigger frame, and wherein the trigger frame triggers the second station to send data through a transmit beam indicated by a transmit beam indication;
 determining, by the second station and based on the correspondence between the plurality of antenna configuration numbers and the plurality of corresponding antenna configurations, the transmit beam indication, wherein the transmit beam indication is used to indicate the transmit beam used by the second station to send the data, and wherein the identifier of the second station is used to indicate the second station; and
 sending, by the second station, the data to the first station through the transmit beam indicated by the transmit beam indication.

7. The method according to claim 6, wherein the transmit beam indication comprises at least one of the following information:
 a transmit beam identifier, wherein the transmit beam identifier is used to indicate the transmit beam corresponding to the second station;
 a transmit antenna identifier, wherein the transmit antenna identifier is used to indicate a transmit antenna corresponding to the second station;
 a transmit sector identifier, wherein the transmit sector identifier is used to indicate a transmit sector corresponding to the second station; or
 a second antenna weight vector (AWV) identifier, wherein the second AWV identifier is used to indicate an AWV corresponding to the second station.

8. The method according to claim 6, wherein the transmit beam indication comprises at least one of the following information:
 an antenna configuration number, wherein the antenna configuration number is used to indicate an antenna configuration of a station group to which the second station belongs, and wherein the antenna configuration comprises a correspondence between a transmit antenna and a transmit beam in the station group; or
 a spatial stream bitmap, wherein the spatial stream bitmap is used to indicate a spatial stream corresponding to the second station.

9. The method according to claim 6, wherein the configuration indication further comprises a receive beam indication, and wherein the receive beam indication comprises at least one of the following information:
 a receive antenna identifier, wherein the receive antenna identifier is used to indicate a receive antenna of the first station;
 a receive sector identifier, wherein the receive sector identifier is used to indicate a receive sector of the first station; or
 a first antenna weight vector (AWV) identifier, wherein the first AWV identifier is used to indicate an AWV of the first station.

10. The method according to claim 6, wherein the configuration indication is carried in at least one physical layer protocol data unit (PPDU), and wherein the configuration indication is carried in one or more of the following information in the PPDU: a physical layer header, a media access control header, media access control frame content, or a control trailer.

11. A wireless communications apparatus, comprising:
 at least one processor; and
 one or more memories coupled to the at least one processor and storing programming instructions for execution by the at least one processor to:
  determine, by a first station, one or more configuration indications based on a correspondence between a plurality of antenna configuration numbers and a plurality of corresponding antenna configurations, wherein each antenna configuration number corresponds to a different antenna configuration for one or more second stations, wherein one configuration indication in the one or more configuration indications corresponds to one second station in the one or more second stations, wherein the configuration indication comprises an identifier of the second station and a transmit beam indication, wherein the transmit beam indication is used to indicate a transmit beam used by the second station to send data, and wherein the identifier of the second station is used to indicate the second station;

send, by the first station to the one or more second stations, the correspondence between the plurality of antenna configuration numbers and the plurality of corresponding antenna configurations;

after sending the correspondence between the plurality of antenna configuration numbers and the plurality of corresponding antenna configurations, send, by the first station, the one or more configuration indications to the one or more second stations, wherein the configuration indication is carried in a trigger frame, and wherein the trigger frame triggers the second station to send data through the transmit beam indicated by the transmit beam indication; and receive, by the first station, data that is separately sent by the one or more second stations through one or more transmit beams indicated by using one or more transmit beam indications.

12. The apparatus according to claim 11, wherein the transmit beam indication comprises at least one of the following information:
   a transmit beam identifier, wherein the transmit beam identifier is used to indicate the transmit beam corresponding to the second station;
   a transmit antenna identifier, wherein the transmit antenna identifier is used to indicate a transmit antenna corresponding to the second station;
   a transmit sector identifier, wherein the transmit sector identifier is used to indicate a transmit sector corresponding to the second station; or
   a second antenna weight vector (AWV) identifier, wherein the second AWV identifier is used to indicate an AWV corresponding to the second station.

13. The apparatus according to claim 11, wherein the transmit beam indication comprises at least one of the following information:
   an antenna configuration number, wherein the antenna configuration number is used to indicate an antenna configuration of a station group to which the second station belongs, and wherein the antenna configuration comprises a correspondence between a transmit antenna and a transmit beam in the station group; or
   a spatial stream bitmap, wherein the spatial stream bitmap is used to indicate a spatial stream corresponding to the second station.

14. The apparatus according to claim 11, wherein the configuration indication further comprises a receive beam indication, and wherein the receive beam indication comprises at least one of the following information:
   a receive antenna identifier, wherein the receive antenna identifier is used to indicate a receive antenna of the apparatus;
   a receive sector identifier, wherein the receive sector identifier is used to indicate a receive sector of the apparatus; or
   a first antenna weight vector (AWV) identifier, wherein the first AWV identifier is used to indicate an AWV of the apparatus.

15. The apparatus according to claim 11, wherein the configuration indication is carried in at least one physical layer protocol data unit (PPDU), and wherein the configuration indication is carried in one or more of the following information in the PPDU: a physical layer header, a media access control header, media access control frame content, or a control trailer.

16. A wireless communications apparatus, comprising:
   at least one processor; and
   one or more memories coupled to the at least one processor and storing programming instructions for execution by the at least one processor to:
      receive, by a second station, a correspondence between a plurality of antenna configuration numbers and a plurality of corresponding antenna configurations sent by a first station, wherein each antenna configuration number corresponds to a different antenna configuration for one or more second stations;
      after receiving the correspondence between the plurality of antenna configuration numbers and the plurality of corresponding antenna configurations, receive, by the second station, a configuration indication sent by the first station, wherein the configuration indication comprises an identifier of the second station, wherein the configuration indication is carried in a trigger frame, and wherein the trigger frame triggers the second station to send data through a transmit beam indicated by a transmit beam indication;
      determine, by the second station and based on the correspondence between the plurality of antenna configuration numbers and the plurality of corresponding antenna configurations, the transmit beam indication, wherein the transmit beam indication is used to indicate the transmit beam used by the second station to send the data, and wherein the identifier of the second station is used to indicate the second station; and
      send, by the second station, the data to the first station through the transmit beam indicated by the transmit beam indication.

17. The apparatus according to claim 16, wherein the transmit beam indication comprises at least one of the following information:
   a transmit beam identifier, wherein the transmit beam identifier is used to indicate the transmit beam corresponding to the apparatus;
   a transmit antenna identifier, wherein the transmit antenna identifier is used to indicate a transmit antenna corresponding to the apparatus;
   a transmit sector identifier, wherein the transmit sector identifier is used to indicate a transmit sector corresponding to the apparatus; or
   a second antenna weight vector (AWV) identifier, wherein the second AWV identifier is used to indicate an AWV corresponding to the apparatus.

18. The apparatus according to claim 16, wherein the transmit beam indication comprises at least one of the following information:
   an antenna configuration number, wherein the antenna configuration number is used to indicate an antenna configuration of a station group to which the apparatus belongs, and wherein the antenna configuration comprises a correspondence between a transmit antenna and a transmit beam in the station group; or a spatial stream bitmap, wherein the spatial stream bitmap is used to indicate a spatial stream corresponding to the apparatus.

19. The apparatus according to claim 16, wherein the configuration indication further comprises a receive beam indication, and wherein the receive beam indication comprises one or a combination of the following information:
  a receive antenna identifier, wherein the receive antenna identifier is used to indicate a receive antenna of the first station;
  a receive sector identifier, wherein the receive sector identifier is used to indicate a receive sector of the first station; or
  a first antenna weight vector (AWV) identifier, wherein the first AWV identifier is used to indicate an AWV of the first station.

20. The apparatus according to claim 16, wherein the configuration indication is carried in at least one physical layer protocol data unit (PPDU), and wherein the configuration indication is carried in one or more of the following information in the PPDU: a physical layer header, a media access control header, media access control frame content, or a control trailer.

* * * * *